United States Patent
Lewis et al.

(10) Patent No.: US 9,239,457 B2
(45) Date of Patent: Jan. 19, 2016

(54) CIRCUITS FOR CONTROLLING DISPLAY APPARATUS

(75) Inventors: Stephen R. Lewis, Reading, MA (US); Stephen English, Billerica, MA (US); Jianguo Yao, Londonderry, NH (US); John DeRoo, Hopkinton, MA (US); Roger W. Barton, Afton, MA (US)

(73) Assignee: Pixtronix, Inc., San Diego, CA (US)

( * ) Notice: Subject to any disclaimer, the term of this patent is extended or adjusted under 35 U.S.C. 154(b) by 0 days.

(21) Appl. No.: 13/548,007

(22) Filed: Jul. 12, 2012

(65) Prior Publication Data

US 2013/0176611 A1 Jul. 11, 2013

Related U.S. Application Data

(60) Provisional application No. 61/508,192, filed on Jul. 15, 2011.

(51) Int. Cl.
*G02B 26/00* (2006.01)
*G02F 1/03* (2006.01)
(Continued)

(52) U.S. Cl.
CPC .............. *G02B 26/02* (2013.01); *G02B 26/005* (2013.01); *G02B 26/023* (2013.01);
(Continued)

(58) Field of Classification Search
CPC .............. G09G 2300/0842; G09G 2300/0838; G09G 3/3433; G09G 2360/18; G09G 2300/0809; G09G 2310/0262; G09G 2300/0876; G09G 2310/0235; G09G 3/3473; G09G 2300/08; G09G 2300/0857; G09G 2300/0866

USPC .......... 359/290–292, 295, 297, 298, 237, 242, 359/254, 267, 269, 270, 277; 345/109, 690, 345/84, 85, 90, 92, 55, 100, 98, 99
See application file for complete search history.

(56) References Cited

U.S. PATENT DOCUMENTS 7,218,499 B2   5/2007   Martin et al.
7,777,715 B2   8/2010   Chui et al.
(Continued)

FOREIGN PATENT DOCUMENTS

CN   101887693 A   11/2010
JP   H08335834 A   12/1996
(Continued)

OTHER PUBLICATIONS

International Search Report and Written Opinion—PCT/US2012/046700—ISA/EPO—Jun. 20, 2013.
(Continued)

*Primary Examiner* — Stephone B Allen
*Assistant Examiner* — Brandi Thomas
(74) *Attorney, Agent, or Firm* — Edward A. Gordon; Foley & Lardner LLP

(57) ABSTRACT

A display apparatus includes an array of light modulators. Each light modulator has a first actuator configured to drive the light modulator into a first state and a second actuator configured to drive the light modulator into a second state. The display apparatus also includes a control matrix including, for each light modulator in the array, a single actuation voltage interconnect. The actuation voltage interconnect is configured to apply a first drive voltage to the first actuator of the light modulator and apply a second drive voltage to the second actuator of the light modulator. In addition, the actuation voltage interconnect is configured to control application of a data voltage to a latch circuit to control the application of the first and second drive voltages to the first and second actuators.

11 Claims, 17 Drawing Sheets

(51) Int. Cl.
*G02F 1/07* (2006.01)
*G02B 26/02* (2006.01)
*G09G 3/34* (2006.01)

(52) U.S. Cl.
CPC ........... *G09G 3/3433* (2013.01); *G09G 3/3466* (2013.01); *G09G 2300/0465* (2013.01); *G09G 2300/0473* (2013.01); *G09G 2300/0838* (2013.01); *G09G 2300/0842* (2013.01); *G09G 2300/0857* (2013.01); *G09G 2300/0866* (2013.01); *G09G 2300/0876* (2013.01); *G09G 2310/063* (2013.01)

(56) References Cited

U.S. PATENT DOCUMENTS

| | | | |
|---|---|---|---|
| 7,839,356 | B2 | 11/2010 | Hagood et al. |
| 2006/0250325 | A1 | 11/2006 | Hagood et al. |
| 2007/0086078 | A1* | 4/2007 | Hagood et al. ................ 359/298 |
| 2008/0174532 | A1 | 7/2008 | Lewis |
| 2009/0052008 | A1 | 2/2009 | McNie et al. |
| 2009/0160826 | A1 | 6/2009 | Miller et al. |
| 2011/0001738 | A1 | 1/2011 | Hong et al. |
| 2011/0037684 | A1 | 2/2011 | Zhang et al. |
| 2011/0148948 | A1 | 6/2011 | Gandhi et al. |
| 2011/0164067 | A1* | 7/2011 | Lewis et al. ................... 345/690 |
| 2012/0169795 | A1 | 7/2012 | Hagood et al. |

FOREIGN PATENT DOCUMENTS

| | | |
|---|---|---|
| JP | 2005523464 A | 8/2005 |
| WO | 0111740 A1 | 2/2001 |
| WO | WO-03088199 A1 | 10/2003 |
| WO | 2006091738 A1 | 8/2006 |
| WO | 2008005108 A2 | 1/2008 |

OTHER PUBLICATIONS

Nam W. J., et al., "High-Aperture Pixel Design Employing VDD Line Eliminations for Active Matrix Organic Light Emitting Diode Displays", Japanese Journal of Applied Physics, The Japan Society of Applied Physics, Japan Society of Applied Physics, Tokyo; JP, vol. 45, No. 4A, 1 Apr. 1, 2006, pp. 2433-2436, XP001245734, ISSN: 0021-4922, DOI: 10.1143/JJAP.45.2433.
Partial International Search Report—PCT/US2012/046700—ISA/EPO—Nov. 16, 2012.
Taiwan Search Report—TW101125452—TIPO—Jun. 30, 2014.

* cited by examiner

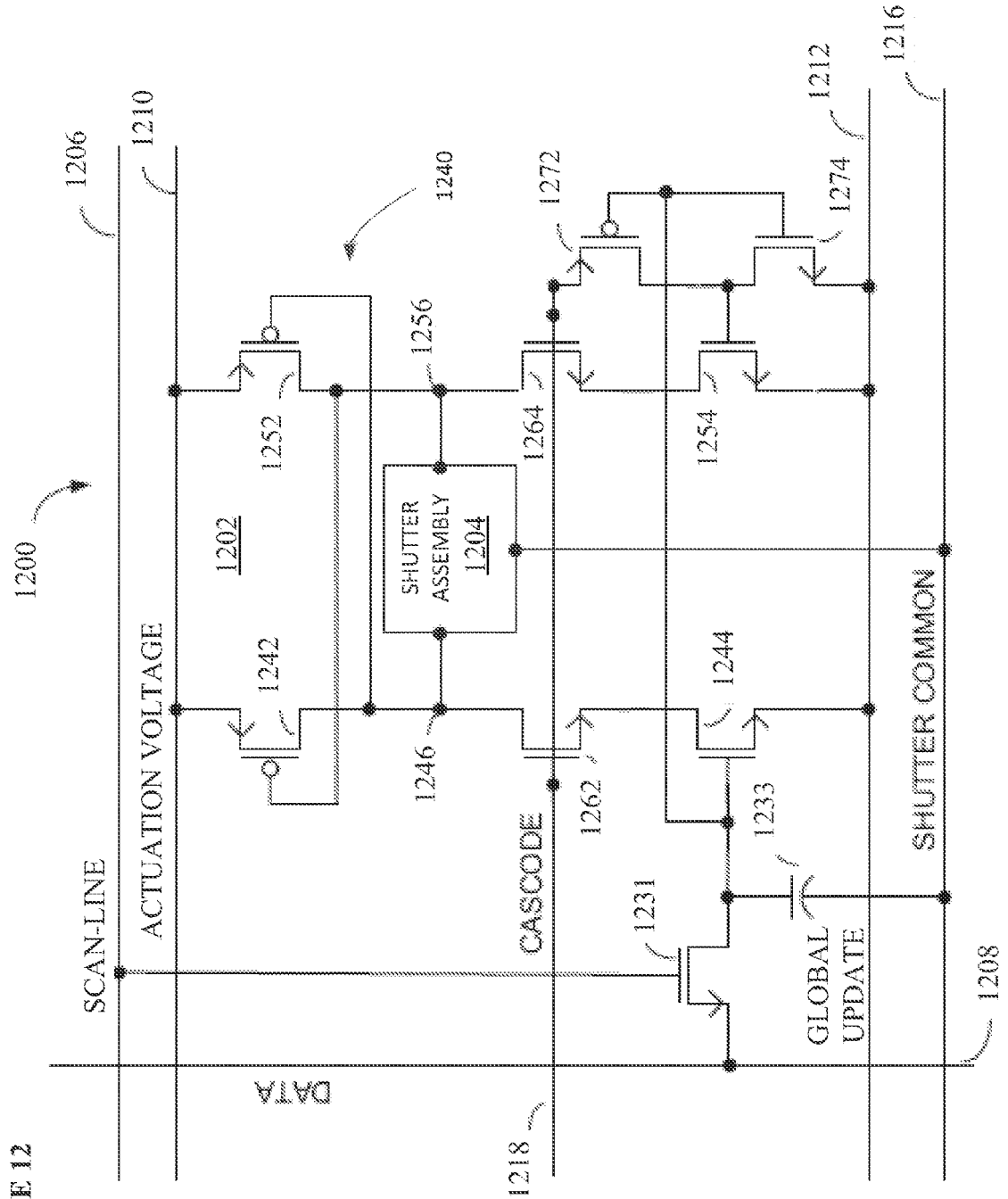

CIRCUITS FOR CONTROLLING DISPLAY APPARATUS

RELATED APPLICATIONS

This Patent Application claims priority to U.S. Provisional Patent Application No. 61/508,192, filed on Jul. 15, 2011, entitled "Circuits for Controlling Display Apparatus." The disclosure of the prior Application is considered part of and is incorporated by reference in this Patent Application.

TECHNICAL FIELD

This disclosure relates to the field of microelectromechanical systems. In particular, this disclosure relates to circuits for controlling an array of light modulators of a display apparatus to generate display images.

DESCRIPTION OF THE RELATED TECHNOLOGY

Various display apparatus include an array of display pixels that have corresponding light modulators that transmit light to form images. The light modulators include actuators for driving the light modulators between a first state and a second state. Some display apparatus utilize dual-actuation light modulators that can be driven into the first state by a first actuator and the second state by a second actuator. The light modulators are controlled by a circuit or control matrix.

SUMMARY

The systems, methods and devices of the disclosure each have several innovative aspects, no single one of which is solely responsible for the desirable attributes disclosed herein.

One innovative aspect of the subject matter described in this disclosure can be implemented in a display apparatus that includes an array of light modulators. Each light modulator has a first actuator configured to drive the light modulator into a first state and a second actuator configured to drive the light modulator into a second state. The display apparatus also includes a control matrix including, for each light modulator in the array, a single actuation voltage interconnect. The actuation voltage interconnect is configured to apply a first drive voltage to the first actuator of the light modulator and apply a second drive voltage to the second actuator of the light modulator. In addition, the actuation voltage interconnect is configured to control application of a data voltage to a latch circuit to control the application of the first and second drive voltages to the first and second actuators.

In some implementations, the control matrix includes a latch circuit that includes a first shutter-state inverter configured to actuate the light modulator to move to the first state and a second shutter-state inverter configured to actuate the light modulator to move to the second state. In such implementations, the first shutter-state inverter is cross-coupled to the second shutter-state inverter. In some such implementations, the first shutter-state inverter includes the first charge transistor and the first discharge transistor and the second shutter-state inverter includes the second charge transistor and the second discharge transistor.

In some implementations, the first and second charge transistors have a first polarity and the respective source terminals of the first and second charge transistors are connected to a common actuation voltage interconnect. In some implementations, the first and second discharge transistors have a second polarity and the respective source terminals of the first and second discharge transistors are electrically connected to the common source interconnect. In some implementations, the first and second charge transistors are p-type transistors and the first and second discharge transistors are n-type transistors. In some implementations, the control matrix includes an update transistor electrically connected to the actuation voltage interconnect such that the actuation voltage interconnect controls the application of the data voltage to the first and second discharge transistors.

Another innovative aspect of the subject matter described in this disclosure can be implemented in a display apparatus that includes an array of light modulators. Each light modulator includes a first actuator configured to drive the light modulator towards a first state and a second actuator configured to move the light modulator into a second state. The display apparatus includes a control matrix including, for each light modulator, a circuit for controlling the light modulator. The circuit includes a first shutter-state inverter configured to control the first actuator of the light modulator and a second shutter-state inverter configured to control the second actuator of the light modulator. An output of the first shutter-state inverter is electrically connected to only one input of the second shutter-state inverter. Further, the control matrix is configured to pre-bias a voltage stored on the circuit.

In some implementations, the first shutter-state inverter includes a first charge transistor and a first discharge transistor and the second shutter-state inverter includes a second charge transistor and a second discharge transistor. In some implementations, the first and second charge transistors are p-type transistors and the source of the first and second charge transistors are connected to a global update interconnect. In some implementations, the first and second discharge transistors are n-type transistors and the source of the first and second discharge transistors are connected to the global update interconnect.

In some implementations, the control matrix is configured to control application of a data voltage to the circuit by electrically coupling a data voltage source to the first discharge transistor. In some implementations, the circuit is configured to pre-bias a voltage stored on the circuit prior to actuation of the light modulator by electrically connecting the first shutter-state inverter and an input of the second shutter-state inverter to a biasing voltage source.

In some implementations, a drain of the first charge transistor and respective gates of the second charge transistor and the second discharge transistor are electrically connected to the biasing voltage source. In some implementations, the biasing voltage source is electrically connected to the first shutter-state inverter and gates of the second shutter-state inverter via a capacitor. In some implementations, the biasing voltage source is electrically connected to the first shutter-state inverter and gates of the second shutter-state inverter via a transistor.

In some implementations, a data store capacitor is coupled to the first shutter-state inverter and coupled to a second-shutter state inverter via a data inverter. In some implementations, the control matrix includes a first cascode transistor coupled to the first shutter-state inverter and a second cascode transistor coupled to the second shutter-state inverter.

Details of one or more implementations of the subject matter described in this specification are set forth in the accompanying drawings and the description below. Although the examples provided in this summary are primarily described in terms of MEMS-based displays, the concepts provided herein may apply to other types of displays, such as LCD, OLED, electrophoretic, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

FIG. 12 shows a portion of an example control matrix.

DETAILED DESCRIPTION

Figure 1A:
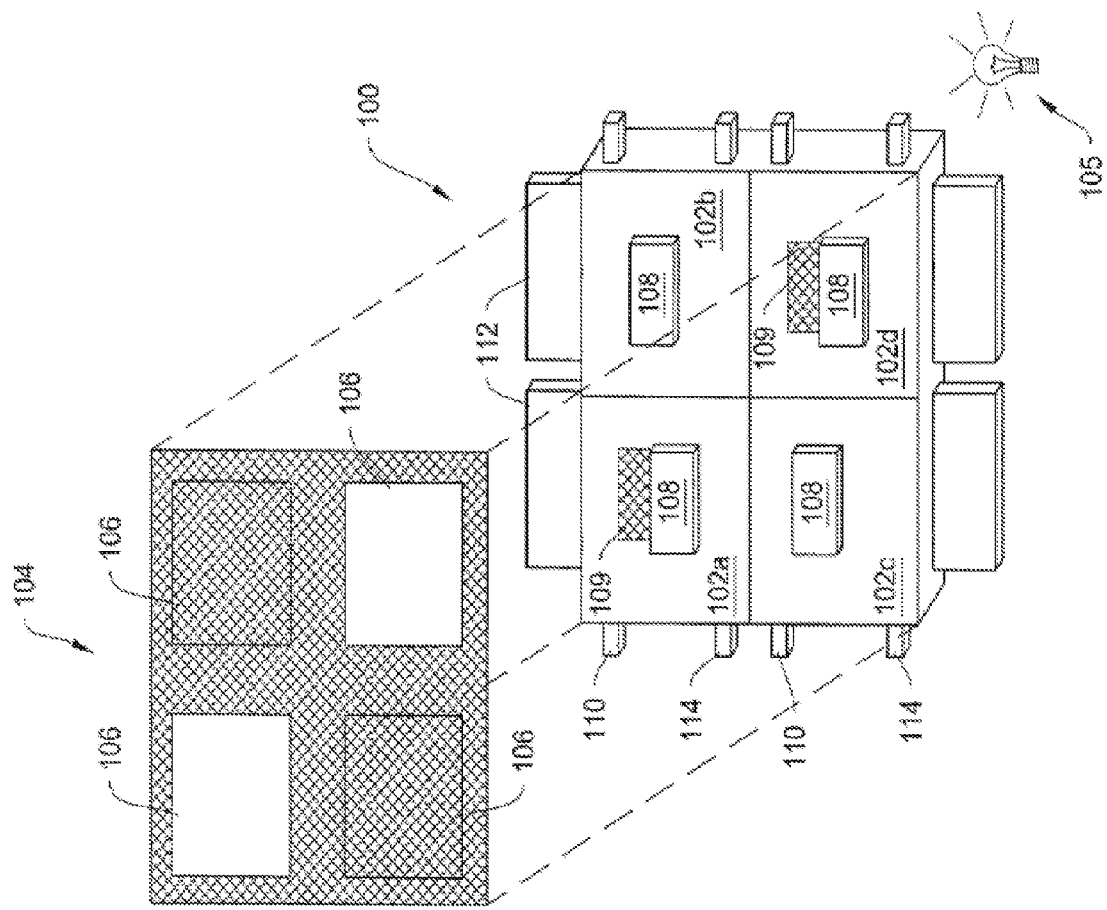
FIG. 1A shows an example schematic diagram of a direct-view MEMS-based display apparatus.

This disclosure relates to circuits for controlling an array of light modulators of a display apparatus to generate display images. In some implementations, each light modulator corresponds to a display pixel. Certain display apparatus include light modulators that include separate actuators for driving the light modulators into a first state, such as an ON state, in which the light modulator transmits light and a second state, such as an OFF state, in which the light modulator does not output any light. The circuits used to drive the actuators described above are arranged into a control matrix. The control matrix addresses each pixel of the array to either be in an ON state corresponding to an ON state for a corresponding light modulator or an OFF state corresponding to the OFF state of the corresponding light modulator for any given image frame.

Prior to displaying a given image frame, the pixels are addressed during a data loading stage in which each of the pixels stores a data voltage corresponding to either the first state or the second state. Upon completion of this data loading stage, in response to a global actuation event, the control matrix sets the image in the light modulators by applying the stored data voltages to one or more transistors forming a latch circuit, coupled to the light modulator. The transistors control the application and/or discharge of drive voltages to the actuators, which in turn control the states of the pixels. This results in the light modulators obtaining the desired states. A light source is then activated to illuminate the light modulators for displaying the given image frame.

In some implementations, the first and second actuators of each light modulator are configured to be driven by respective first and second drive voltages that are applied by a single actuation voltage interconnect. This single actuation voltage interconnect is also configured to control the application of the data voltage to a latch circuit that controls the application of the drive voltages to the first and second actuators. This obviates the need for a separate update interconnect and therefore allows the control matrix to save valuable substrate real estate. In some implementations, the actuator voltage effectuates this control by controlling a p-type metal oxide semiconductor (pMOS) transistor positioned between a data store capacitor and the latch circuit.

In some implementations, current leakages are reduced by including a pMOS transistor as an update switch. Since pMOS transistors are relatively more resilient and capable of handling high gate voltages than n-type metal oxide semiconductor (nMOS) transistors, the use of the pMOS transistor improves the reliability of the control matrix. In some other implementations, a full latch circuit is replaced with a half latch circuit, in which at least one transistor gate in the latch circuit is disconnected from inverter feedback. One issue that can arise due to the asymmetry in a latch circuit is that latch circuit can assume an indeterminate state. To account for this, a capacitor or transistor can be added to pre-bias a voltage stored on the latch circuit.

Particular implementations of the subject matter described in this disclosure can be implemented to realize one or more of the following potential advantages. By utilizing a pMOS transistor as an update switch, the reliability of the control matrix is increased and current leakages can be reduced. Further, in some implementations, the number of common interconnects are reduced relative to previous control matrices, thereby saving valuable substrate real estate. Moreover, the use of a pre-bias capacitor or transistor with a half-latch circuit obviates the need for an update switch. In addition, by pre-biasing a voltage stored on the latch circuit, the latch circuit is prevented from assuming an indeterminate state.

FIG. 1A shows a schematic diagram of a direct-view MEMS-based display apparatus 100. The display apparatus 100 includes a plurality of light modulators 102a-102d (generally "light modulators 102") arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide luminance level in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or "backlight" so that each pixel can be uniformly illuminated. Transmissive direct-view displays are often built onto transparent or glass substrates to facilitate a sandwich assembly arrangement where one substrate, containing the light modulators, is positioned directly on top of the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (e.g., interconnects 110, 112 and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{WE}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
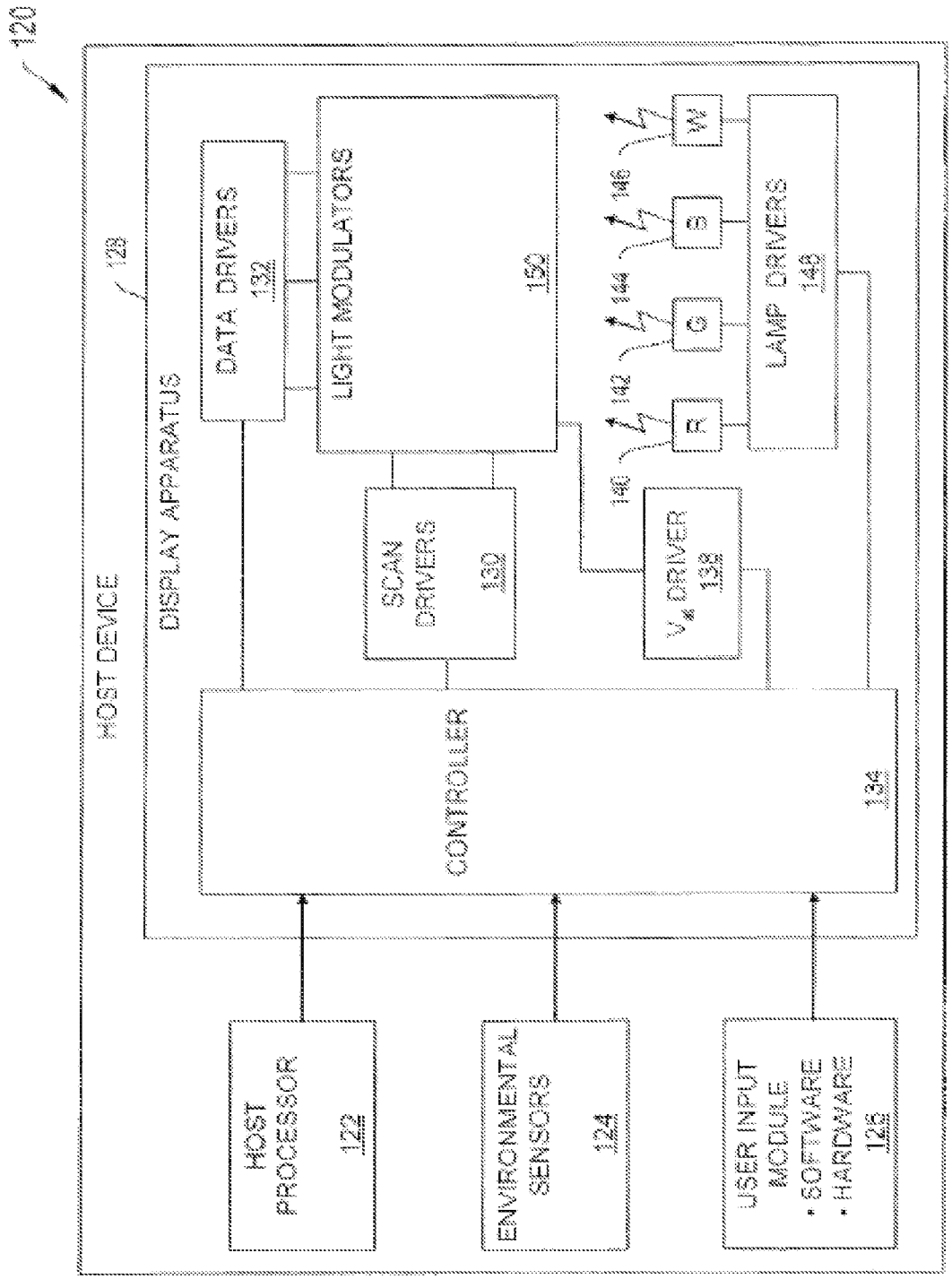
FIG. 1B shows an example block diagram of a host device.

FIG. 1B shows an example of a block diagram 120 of a host device (i.e., cell phone, smart phone, PDA, MP3 player, tablet, e-reader, etc.). The host device includes a display apparatus 128, a host processor 122, environmental sensors 124, a user input module 126, and a power source.

The display apparatus 128 includes a plurality of scan drivers 130 (also referred to as "write enabling voltage sources"), a plurality of data drivers 132 (also referred to as "data voltage sources"), a controller 134, common drivers 138, lamps 140-146, lamp drivers 148 and light modulators 150. The scan drivers 130 apply write enabling voltages to scan-line interconnects 110. The data drivers 132 apply data voltages to the data interconnects 112.

In some implementations of the display apparatus, the data drivers 132 are configured to provide analog data voltages to the light modulators, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the "controller 134"). The controller sends data to the data drivers 132 in a mostly serial fashion, organized in predetermined sequences grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all light modulators within the array of light modulators, for instance by supplying voltage to a series of common interconnects 114. In some other implementations, the common drivers 138, following commands from the controller 134, issue voltage pulses or signals to the array of light modulators, for instance global actuation pulses which are capable of driving and/or initiating simultaneous actuation of all light modulators in multiple rows and columns of the array.

All of the drivers (e.g., scan drivers 130, data drivers 132 and common drivers 138) for different display functions are time-synchronized by the controller 134. Timing commands from the controller coordinate the illumination of red, green and blue and white lamps (140, 142, 144 and 146 respectively) via lamp drivers 148, the write-enabling and sequencing of specific rows within the array of pixels, the output of voltages from the data drivers 132, and the output of voltages that provide for light modulator actuation.

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from 10 to 300 Hertz (Hz). In some implementations the setting of an image frame to the array is synchronized with the illumination of the lamps 140, 142, 144 and 146 such that alternate image frames are illuminated with an alternating series of colors, such as red, green, and blue. The image frames for each respective color is referred to as a color subframe. In this method, referred to as the field sequential color method, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 134 forms an image by the method of time division gray scale, as previously described. In some other implementations, the display apparatus 100 can provide gray scale through the use of multiple shutters 108 per pixel.

In some implementations, the data for an image state 104 is loaded by the controller 134 to the modulator array by a sequential addressing of individual rows, also referred to as scan lines. For each row or scan line in the sequence, the scan driver 130 applies a write-enable voltage to the write enable interconnect 110 for that row of the array, and subsequently the data driver 132 supplies data voltages, corresponding to desired shutter states, for each column in the selected row. This process repeats until data has been loaded for all rows in the array. In some implementations, the sequence of selected rows for data loading is linear, proceeding from top to bottom in the array. In some other implementations, the sequence of selected rows is pseudo-randomized, in order to minimize visual artifacts. And in some other implementations the sequencing is organized by blocks, where, for a block, the data for only a certain fraction of the image state 104 is loaded to the array, for instance by addressing only every $5^{th}$ row of the array in sequence.

In some implementations, the process for loading image data to the array is separated in time from the process of actuating the shutters 108. In these implementations, the modulator array may include data memory elements for each pixel in the array and the control matrix may include a global actuation interconnect for carrying trigger signals, from common driver 138, to initiate simultaneous actuation of shutters 108 according to data stored in the memory elements.

In alternative implementations, the array of pixels and the control matrix that controls the pixels may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

The host processor 122 generally controls the operations of the host. For example, the host processor may be a general or special purpose processor for controlling a portable electronic device. With respect to the display apparatus 128, included within the host device 120, the host processor outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

The user input module 126 conveys the personal preferences of the user to the controller 134, either directly, or via the host processor 122. In some implementations, the user input module is controlled by software in which the user programs personal preferences such as "deeper color," "better contrast," "lower power," "increased brightness," "sports," "live action," or "animation." In some other implementations, these preferences are input to the host using hardware, such as a switch or dial. The plurality of data inputs to the controller 134 direct the controller to provide data to the various drivers 130, 132, 138 and 148 which correspond to optimal imaging characteristics.

An environmental sensor module 124 also can be included as part of the host device. The environmental sensor module receives data about the ambient environment, such as temperature and or ambient lighting conditions. The sensor module 124 can be programmed to distinguish whether the device is operating in an indoor or office environment versus an outdoor environment in bright daylight versus and outdoor environment at nighttime. The sensor module communicates this information to the display controller 134, so that the controller can optimize the viewing conditions in response to the ambient environment.

Figure 2A:
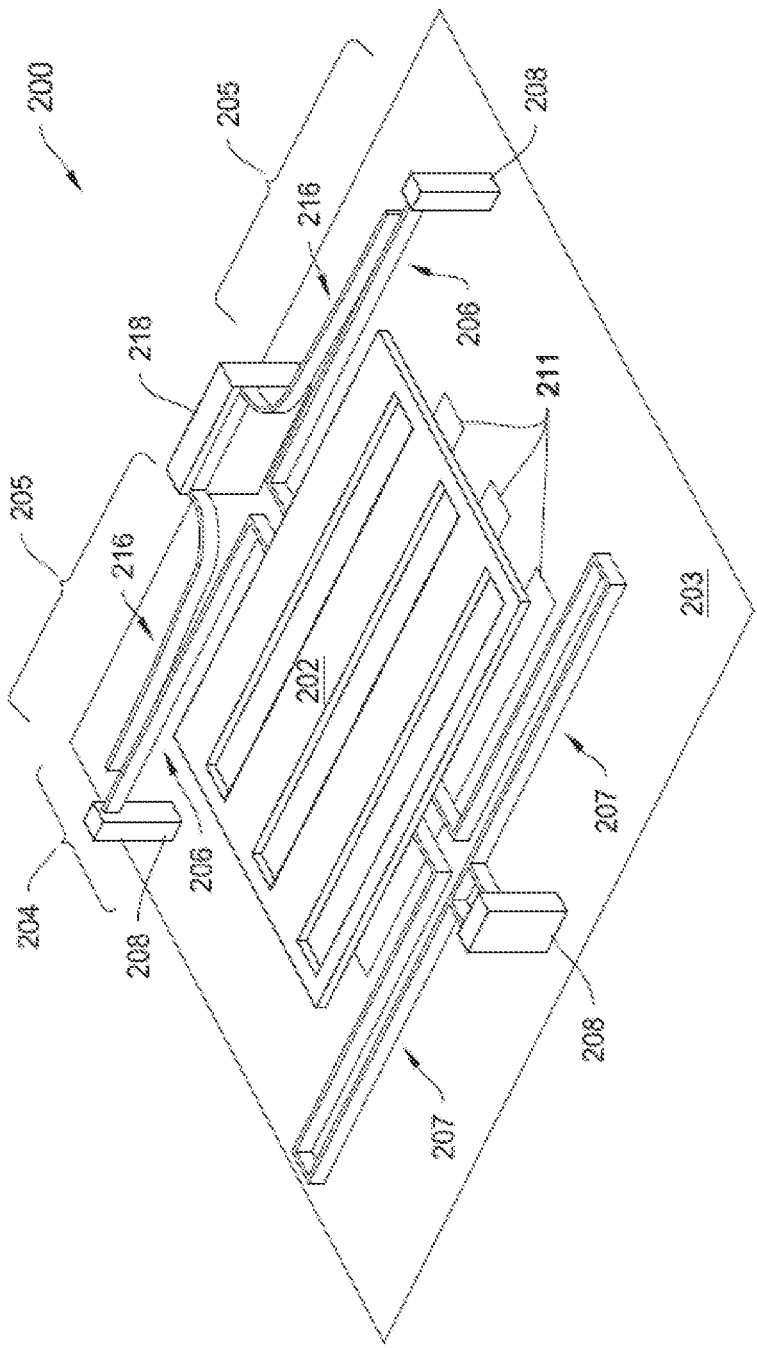
FIG. 2A shows an example perspective view of an illustrative shutter-based light modulator.

FIG. 2A shows a perspective view of an illustrative shutter-based light modulator 200. The shutter-based light modulator is suitable for incorporation into the direct-view MEMS-based display apparatus 100 of FIG. 1A. The light modulator 200 includes a shutter 202 coupled to an actuator 204. The actuator 204 can be formed from two separate compliant electrode beam actuators 205 (the "actuators 205"). The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The surface includes one or more aperture holes 211 for admitting the passage of light. The load anchors 208 physically connect the compliant load beams 206 and the shutter 202 to the surface 203 and electrically connect the load beams 206 to a bias voltage, in some instances, ground.

If the substrate is opaque, such as silicon, then aperture holes 211 are formed in the substrate by etching an array of holes through the substrate 204. If the substrate 204 is transparent, such as glass or plastic, then the aperture holes 211 are formed in a layer of light-blocking material deposited on the substrate 203. The aperture holes 211 can be generally circular, elliptical, polygonal, serpentine, or irregular in shape.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely towards the drive anchor 218. The compliant members 206 act as springs, such that when the voltage across the beams 206 and 216 potential is removed, the load beams 206 push the shutter 202 back into its initial position, releasing the stress stored in the load beams 206.

A light modulator, such as light modulator 200, incorporates a passive restoring force, such as a spring, for returning a shutter to its rest position after voltages have been removed. Other shutter assemblies can incorporate a dual set of "open"

and "closed" actuators and a separate sets of "open" and "closed" electrodes for moving the shutter into either an open or a closed state.

There are a variety of methods by which an array of shutters and apertures can be controlled via a control matrix to produce images, in many cases moving images, with appropriate luminance levels. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve the speed, the luminance level and/or the power dissipation performance of the display.

Figure 2B:
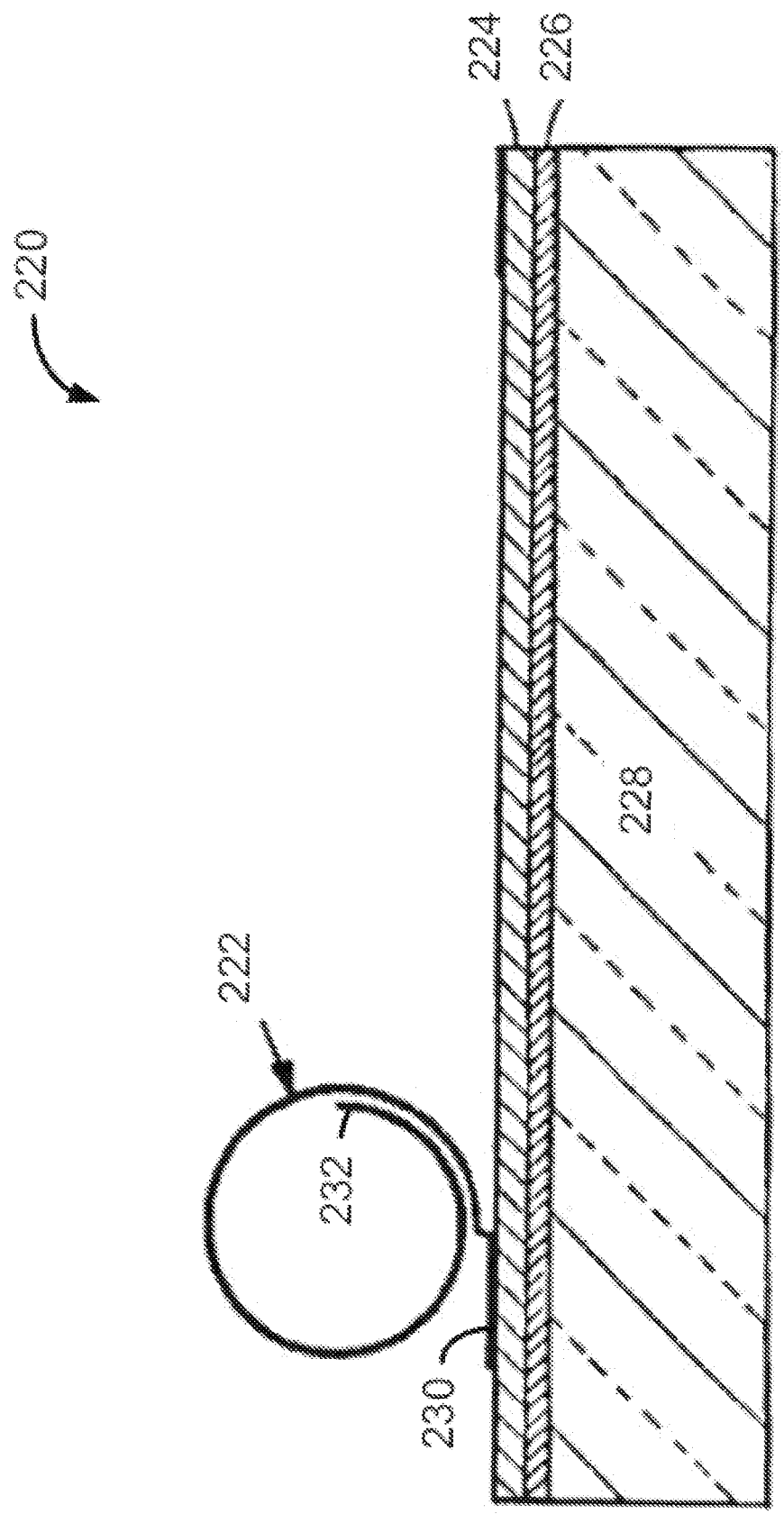
FIG. 2B shows a cross sectional view of a rolling actuator shutter-based light modulator.

The display apparatus 100, in alternative implementations, includes light modulators other than transverse shutter-based light modulators, such as the shutter assembly 200 described above. For example, FIG. 2B shows a cross sectional view of a rolling actuator shutter-based light modulator 220. The rolling actuator shutter-based light modulator 220 is suitable for incorporation into an alternative implementation of the MEMS-based display apparatus 100 of FIG. 1A. A rolling actuator-based light modulator includes a movable electrode disposed opposite a fixed electrode and biased to move in a particular direction to function as a shutter upon application of an electric field. In some implementations, the light modulator 220 includes a planar electrode 226 disposed between a substrate 228 and an insulating layer 224 and a movable electrode 222 having a fixed end 230 attached to the insulating layer 224. In the absence of any applied voltage, a movable end 232 of the movable electrode 222 is free to roll towards the fixed end 230 to produce a rolled state. Application of a voltage between the electrodes 222 and 226 causes the movable electrode 222 to unroll and lie flat against the insulating layer 224, whereby it acts as a shutter that blocks light traveling through the substrate 228. The movable electrode 222 returns to the rolled state by means of an elastic restoring force after the voltage is removed. The bias towards a rolled state may be achieved by manufacturing the movable electrode 222 to include an anisotropic stress state.

Figure 2C:
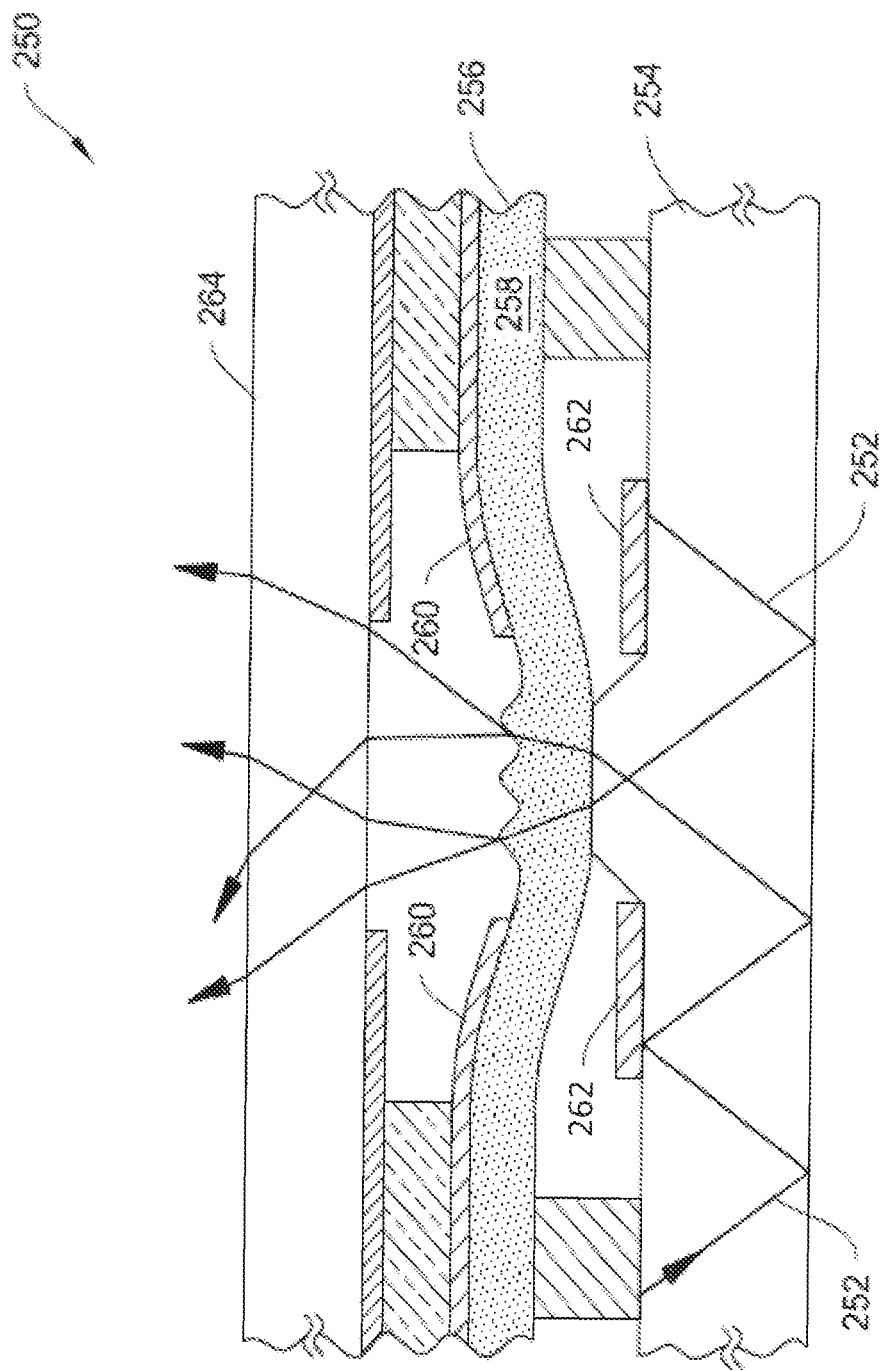
FIG. 2C shows a cross sectional view of an illustrative non shutter-based microelectromechanical systems (MEMS) light modulator.

FIG. 2C shows a cross sectional view of an illustrative non shutter-based MEMS light modulator 250. The light tap modulator 250 is suitable for incorporation into an alternative implementation of the MEMS-based display apparatus 100 of FIG. 1A. A light tap works according to a principle of frustrated total internal reflection (TIR). That is, light 252 is introduced into a light guide 254, in which, without interference, light 252 is, for the most part, unable to escape the light guide 254 through its front or rear surfaces due to TIR. The light tap 250 includes a tap element 256 that has a sufficiently high index of refraction that, in response to the tap element 256 contacting the light guide 254, the light 252 impinging on the surface of the light guide 254 adjacent the tap element 256 escapes the light guide 254 through the tap element 256 towards a viewer, thereby contributing to the formation of an image.

In some implementations, the tap element 256 is formed as part of a beam 258 of flexible, transparent material. Electrodes 260 coat portions of one side of the beam 258. Opposing electrodes 262 are disposed on the light guide 254. By applying a voltage across the electrodes 260 and 262, the position of the tap element 256 relative to the light guide 254 can be controlled to selectively extract light 252 from the light guide 254.

Figure 2D:
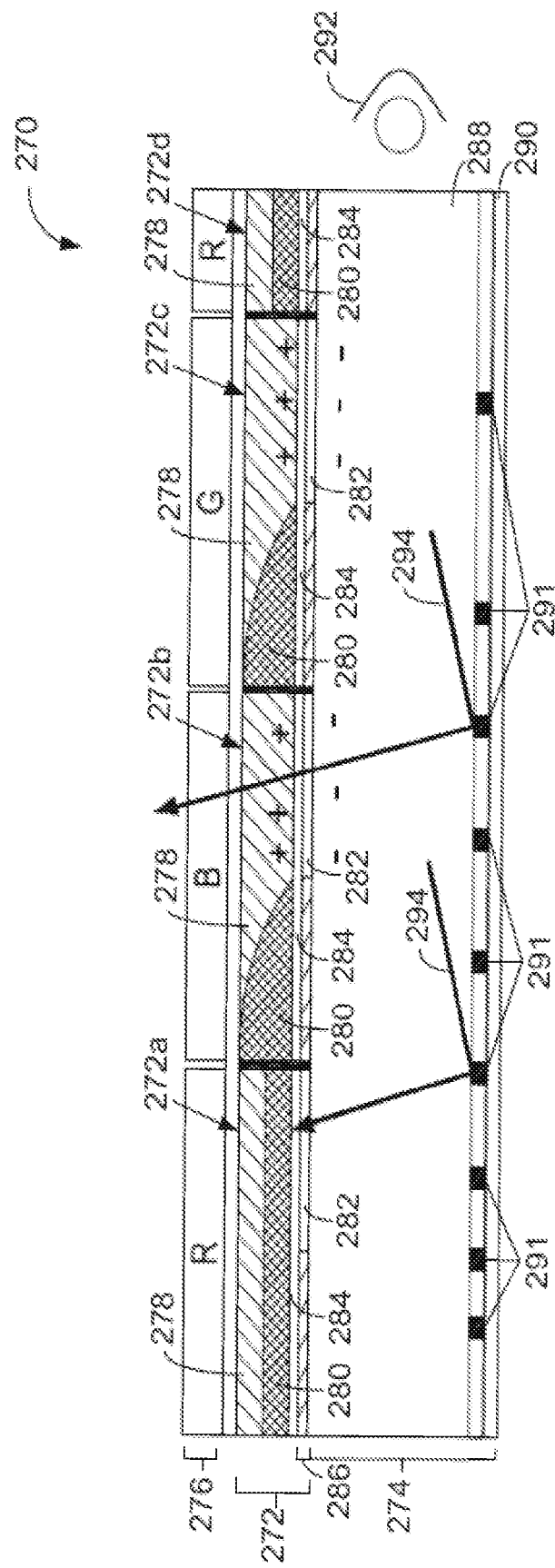
FIG. 2D shows a cross sectional view of an electrowetting-based light modulation array.

FIG. 2D shows an example cross sectional view of an electrowetting-based light modulation array 270. The electrowetting-based light modulation array 270 is suitable for incorporation into an alternative implementation of the MEMS-based display apparatus 100 of FIG. 1A. The light modulation array 270 includes a plurality of electrowetting-based light modulation cells 272a-d (generally "cells 272") formed on an optical cavity 274. The light modulation array 270 also includes a set of color filters 276 corresponding to the cells 272.

Each cell 272 includes a layer of water (or other transparent conductive or polar fluid) 278, a layer of light absorbing oil 280, a transparent electrode 282 (made, for example, from indium-tin oxide (ITO)) and an insulating layer 284 positioned between the layer of light absorbing oil 280 and the transparent electrode 282. In the implementation described herein, the electrode takes up a portion of a rear surface of a cell 272.

The remainder of the rear surface of a cell 272 is formed from a reflective aperture layer 286 that forms the front surface of the optical cavity 274. The reflective aperture layer 286 is formed from a reflective material, such as a reflective metal or a stack of thin films forming a dielectric mirror. For each cell 272, an aperture is formed in the reflective aperture layer 286 to allow light to pass through. The electrode 282 for the cell is deposited in the aperture and over the material forming the reflective aperture layer 286, separated by another dielectric layer.

The remainder of the optical cavity 274 includes a light guide 288 positioned proximate the reflective aperture layer 286, and a second reflective layer 290 on a side of the light guide 288 opposite the reflective aperture layer 286. A series of light redirectors 291 are formed on the rear surface of the light guide, proximate the second reflective layer. The light redirectors 291 may be either diffuse or specular reflectors. One or more light sources 292, such as LEDs, inject light 294 into the light guide 288.

In an alternative implementation, an additional transparent substrate (not shown) is positioned between the light guide 288 and the light modulation array 270. In this implementation, the reflective aperture layer 286 is formed on the additional transparent substrate instead of on the surface of the light guide 288.

In operation, application of a voltage to the electrode 282 of a cell (for example, cell 272b or 272c) causes the light absorbing oil 280 in the cell to collect in one portion of the cell 272. As a result, the light absorbing oil 280 no longer obstructs the passage of light through the aperture formed in the reflective aperture layer 286 (see, for example, cells 272b and 272c). Light escaping the backlight at the aperture is then able to escape through the cell and through a corresponding color filter (for example, red, green or blue) in the set of color filters 276 to form a color pixel in an image. When the electrode 282 is grounded, the light absorbing oil 280 covers the aperture in the reflective aperture layer 286, absorbing any light 294 attempting to pass through it.

The area under which oil 280 collects when a voltage is applied to the cell 272 constitutes wasted space in relation to forming an image. This area is non-transmissive, whether a voltage is applied or not. Therefore, without the inclusion of the reflective portions of reflective apertures layer 286, this area absorbs light that otherwise could be used to contribute to the formation of an image. However, with the inclusion of the reflective aperture layer 286, this light, which otherwise would have been absorbed, is reflected back into the light guide 290 for future escape through a different aperture. The electrowetting-based light modulation array 270 is not the only example of a non-shutter-based MEMS modulator suitable for inclusion in the display apparatus described herein. Other forms of non-shutter-based MEMS modulators could likewise be controlled by various ones of the controller functions described herein without departing from the scope of this disclosure.

Figure 3A:
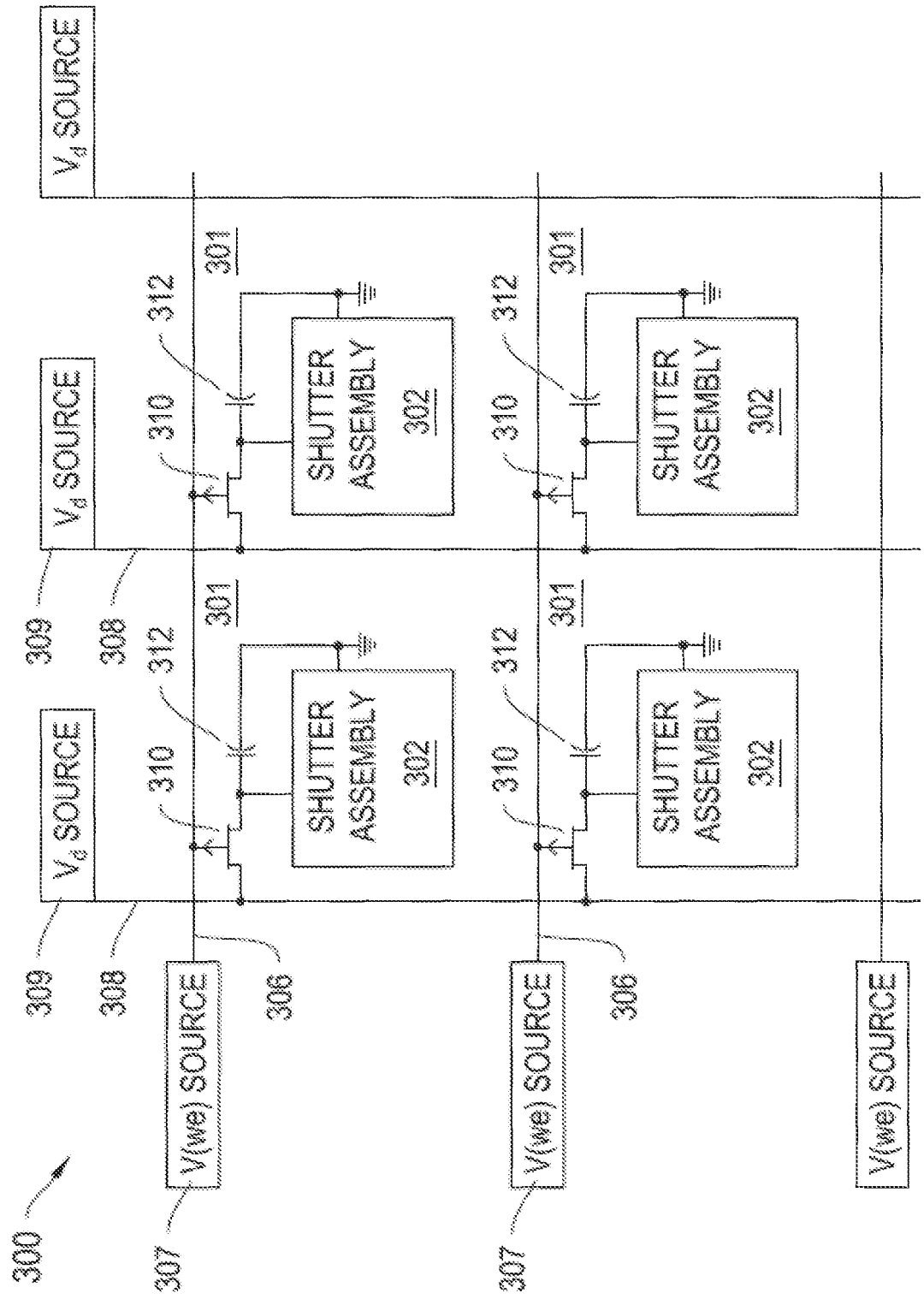
FIG. 3A shows an example schematic diagram of a control matrix.
Figure 3B:
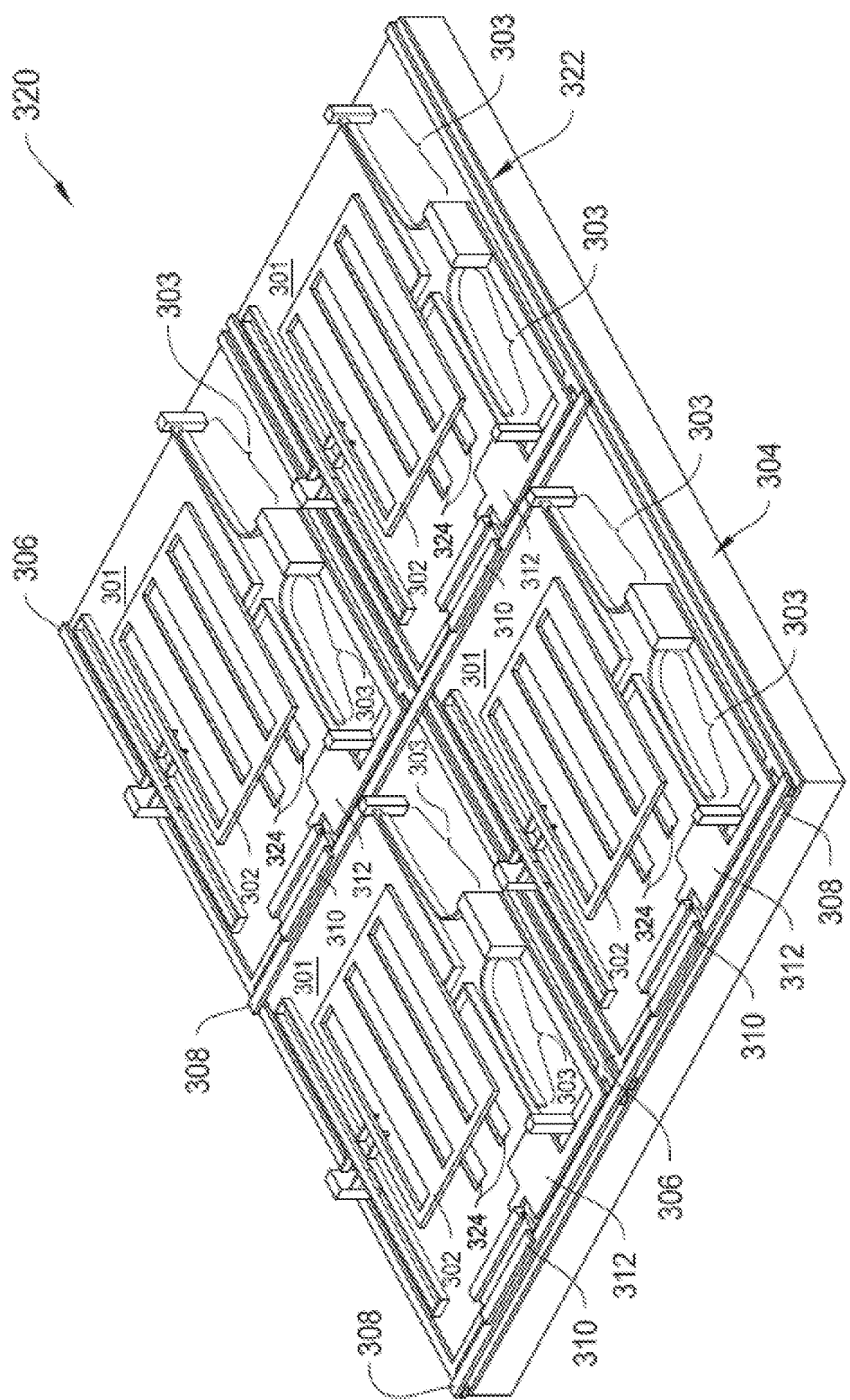
FIG. 3B shows a perspective view of an array of shutter-based light modulators connected to the control matrix of FIG. 3A.

FIG. 3A shows an example schematic diagram of a control matrix 300. The control matrix 300 is suitable for controlling the light modulators incorporated into the MEMS-based display apparatus 100 of FIG. 1A. FIG. 3B shows a perspective view of an array 320 of shutter-based light modulators connected to the control matrix 300 of FIG. 3A. The control matrix 300 may address an array of pixels 320 (the "array 320"). Each pixel 301 can include an elastic shutter assembly 302, such as the shutter assembly 200 of FIG. 2A, controlled by an actuator 303. Each pixel also can include an aperture layer 322 that includes apertures 324.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source 309 ("$V_d$ source") to the pixels 301 in a corresponding column of pixels. In the control matrix 300, the $V_d$ source 309 provides the majority of the energy to be used for actuation of the shutter assemblies 302. Thus, the data voltage source, $V_d$ source 309, also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly 302 actuates, opening the shutter in that shutter assembly 302. The voltage applied to the data interconnect 308 remains stored in the capacitor 312 of the pixel 301 even after the control matrix 300 ceases to apply $V_{we}$ to a row. Therefore, the voltage $V_{we}$ does not have to wait and hold on a row for times long enough for the shutter assembly 302 to actuate; such actuation can proceed after the write-enabling voltage has been removed from the row. The capacitors 312 also function as memory elements within the array 320, storing actuation instructions for the illumination of an image frame.

The pixels 301 as well as the control matrix 300 of the array 320 are formed on a substrate 304. The array includes an aperture layer 322, disposed on the substrate 304, which includes a set of apertures 324 for respective pixels 301 in the array 320. The apertures 324 are aligned with the shutter assemblies 302 in each pixel. In some implementations, the substrate 304 is made of a transparent material, such as glass or plastic. In some other implementations, the substrate 304 is made of an opaque material, but in which holes are etched to form the apertures 324.

The shutter assembly 302 together with the actuator 303 can be made bi-stable. That is, the shutters can exist in at least two equilibrium positions (e.g., open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 also can be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as spring 207 in the shutter-based light modulator 200 depicted in FIG. 2A, or the opposing force may be exerted by an opposing actuator, such as an "open" or "closed" actuator.

The light modulator array 320 is depicted as having a single MEMS light modulator per pixel. Other implementations are possible in which multiple MEMS light modulators are provided in each pixel, thereby providing the possibility of more than just binary "on" or "off" optical states in each pixel. Certain forms of coded area division gray scale are possible where multiple MEMS light modulators in the pixel are provided, and where apertures 324, which are associated with each of the light modulators, have unequal areas.

In some other implementations, the roller-based light modulator 220, the light tap 250, or the electrowetting-based light modulation array 270, as well as other MEMS-based light modulators, can be substituted for the shutter assembly 302 within the light modulator array 320.

Figure 4B:
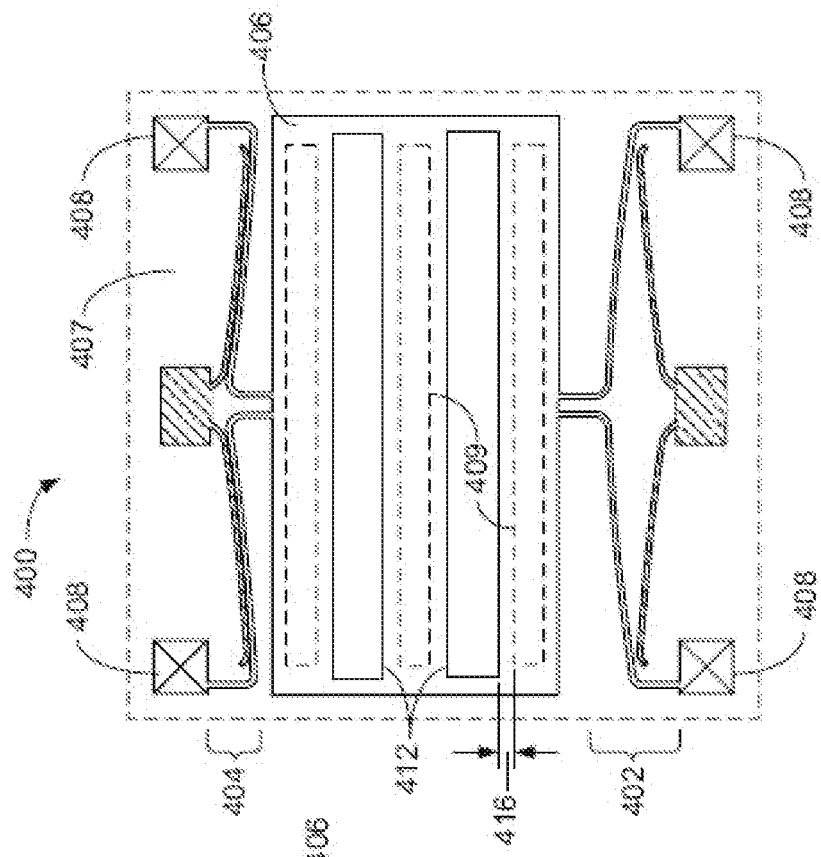
FIGS. 4A and 4B show example views of a dual actuator shutter assembly.
Figure 4A:
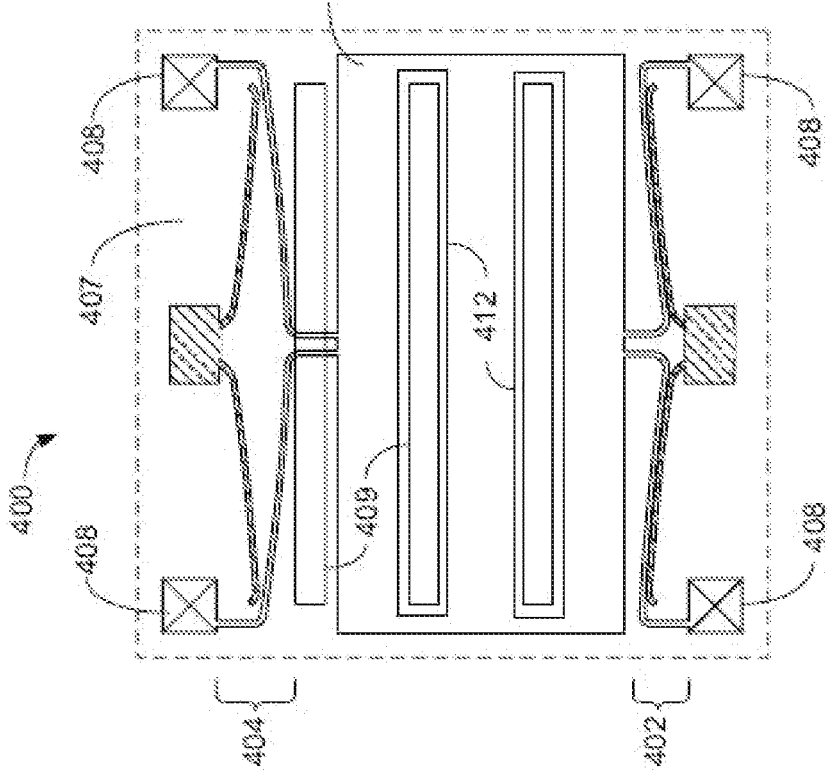

FIGS. 4A and 4B show example views of a dual actuator shutter assembly 400. The dual actuator shutter assembly, as depicted in FIG. 4A, is in an open state. FIG. 4B shows the dual actuator shutter assembly 400 in a closed state. In contrast to the shutter assembly 200, the shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both of the actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. As will be described below, a variety of different control matrices may be used with the shutter assembly 400.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of the shutter apertures 412 coincide with the centerlines of two of the aperture layer apertures 409. In FIG. 4B, the shutter assembly 400 has been moved to the closed state and, as such, the shutter-open actuator 402 is in its relaxed position, the shutter-close actuator 404 has been actuated, and the light blocking portions of shutter 406 are now in position to block transmission of light through the apertures 409 (depicted as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In some other implementations, the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 4B shows a predefined overlap 416 between the edge of light blocking portions in the shutter 406 and one edge of the aperture 409 formed in aperture layer 407.

The electrostatic actuators 402 and 404 are designed so that their voltage-displacement behavior provides a bi-stable characteristic to the shutter assembly 400. For each of the shutter-open and shutter-close actuators, there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$.

Generally, electrical bi-stability in electrostatic actuators, such as actuators 402 and 404, arises from the fact that the electrostatic force across an actuator is a strong function of position as well as voltage. The beams of the actuators in the light modulators 400 and 450 act as capacitor plates. The force between capacitor plates is proportional to $1/d^2$ where d is the local separation distance between capacitor plates. When the actuator is in a closed state, the local separation between the actuator beams is very small. Thus, the application of a small voltage can result in a relatively strong force between the actuator beams of the actuator in the closed state. As a result, a relatively small voltage, such as $V_m$, can keep the actuator in the closed state, even if other elements exert an opposing force on the actuator.

In dual-actuator light modulators, such as 400 and 450, the equilibrium position of the light modulator will be determined by the combined effect of the voltage differences across each of the actuators. In other words, the electrical potentials of the three terminals, namely, the shutter open drive beam, the shutter close drive beam, and the load beams, as well as modulator position, are considered to determine the equilibrium forces on the modulator.

For an electrically bi-stable system, a set of logic rules can describe the stable states and can be used to develop reliable addressing or digital control schemes for a given light modulator. Referring to the shutter-based light modulator 400 as an example, these logic rules are as follows:

Let $V_s$ be the electrical potential on the shutter or load beam. Let $V_o$ be the electrical potential on the shutter-open drive beam. Let $V_c$ be the electrical potential on the shutter-close drive beam. Let the expression $|V_o - V_s|$ refer to the absolute value of the voltage difference between the shutter and the shutter-open drive beam. Let $V_m$ be the maintenance voltage. Let $V_{at}$ be the actuation threshold voltage, i.e., the voltage to actuate an actuator absent the application of $V_m$ to an opposing drive beam. Let $V_{max}$ be the maximum allowable potential for $V_o$ and $V_c$. Let $V_m < V_{at} < V_{max}$. Then, assuming $V_o$ and $V_c$ remain below $V_{max}$:

$$\text{If } |V_o - V_s| < V_m \text{ and } |V_c - V_s| < V_m \quad \text{(rule 1)}$$

Then the shutter will relax to the equilibrium position of its mechanical spring.

$$\text{If } |V_o - V_s| > V_m \text{ and } |V_c - V_s| > V_m \quad \text{(rule 2)}$$

Then the shutter will not move, i.e. it will hold in either the open or the closed state, whichever position was established by the last actuation event.

$$\text{If } |V_o - V_s| > V_{at} \text{ and } |V_c - V_s| < V_m \quad \text{(rule 3)}$$

Then the shutter will move into the open position.

$$\text{If } |V_o - V_s| < V_m \text{ and } |V_c - V_s| > V_{at} \quad \text{(rule 4)}$$

Then the shutter will move into the closed position.

Following rule 1, with voltage differences on each actuator near zero, the shutter will relax. In many shutter assemblies, the mechanically relaxed position is only partially open or closed, and so this voltage condition is usually avoided in an addressing scheme.

The condition of rule 2 makes it possible to include a global actuation function into an addressing scheme. By maintaining a shutter voltage which provides beam voltage differences that are at least the maintenance voltage, $V_m$, the absolute values of the shutter open and shutter closed potentials can be altered or switched in the midst of an addressing sequence over wide voltage ranges (even where voltage differences exceed $V_{at}$) with no danger of unintentional shutter motion.

The conditions of rules 3 and 4 are those that are generally targeted during the addressing sequence to ensure the bi-stable actuation of the shutter.

The maintenance voltage difference, $V_m$, can be designed or expressed as a certain fraction of the actuation threshold voltage, $V_{at}$. For systems designed for a useful degree of bi-stability, the maintenance voltage can exist in a range between about 20% and about 80% of $V_{at}$. This helps ensure that charge leakage or parasitic voltage fluctuations in the system do not result in a deviation of a set holding voltage out of its maintenance range—a deviation which could result in the unintentional actuation of a shutter. In some systems an exceptional degree of bi-stability or hysteresis can be provided, with $V_m$ existing over a range of about 2% and about 98% of $V_{at}$. In these systems, however, care must be taken to ensure that an electrode voltage condition of $V<V_m$ can be reliably obtained within the addressing and actuation time available.

In some implementations, the first and second actuators of each light modulator are coupled to a latch circuit to ensure that the first and second states of the light modulator are the only two stable states that the light modulator can assume. To ensure the integrity of the electrical bi-stability of each light modulator, a pMOS transistor is employed as an update switch to control the application of the data voltage to the latch circuit to control the application of the drive voltages applied to the first and second actuators.

Figure 5:
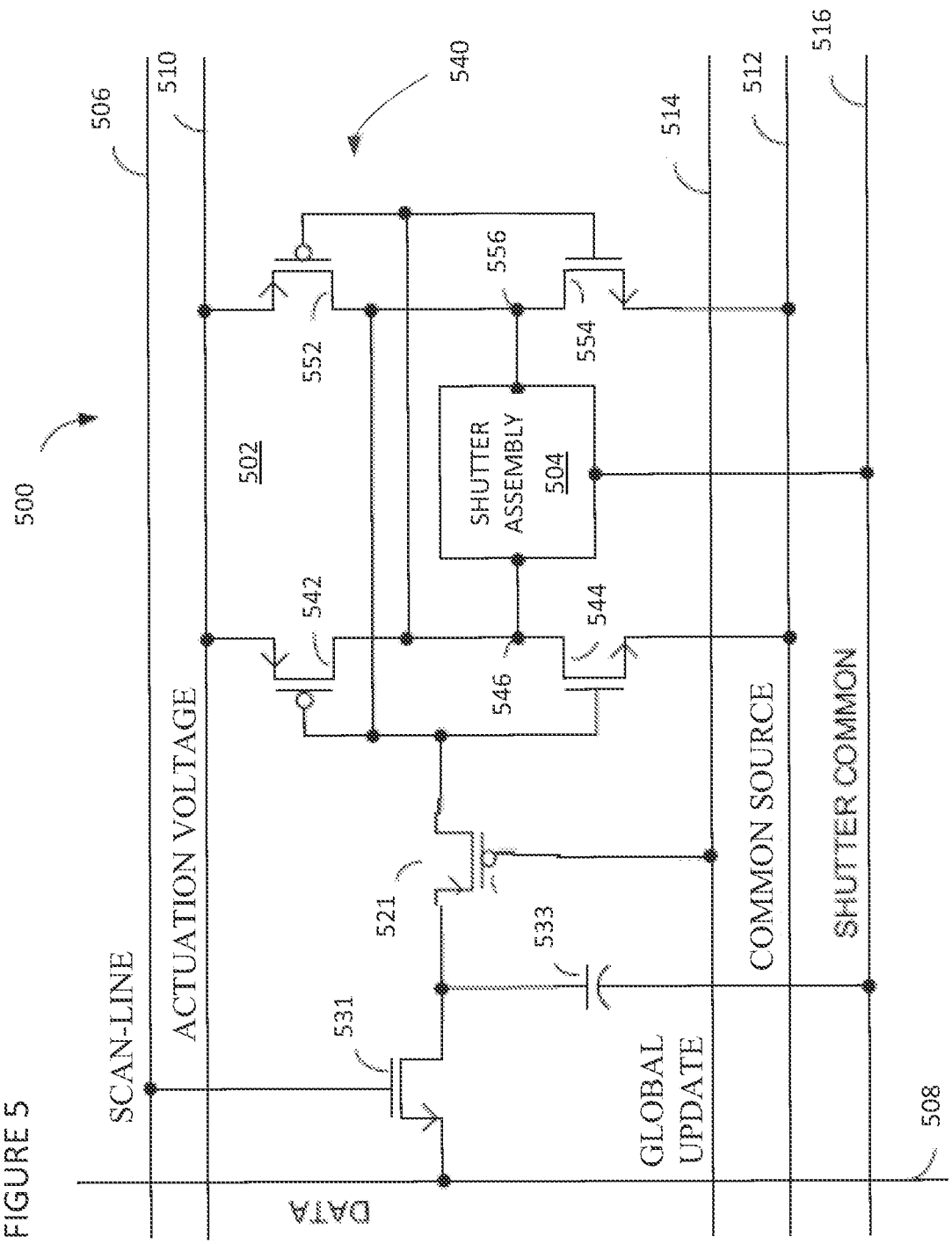
FIG. 5 shows a portion of an example control matrix.

FIG. 5 shows a portion of a control matrix 500. The control matrix 500 can be implemented for use in the display apparatus 100 depicted in FIG. 1. The structure of the control matrix 500 is described immediately below. Its operation will be described thereafter with respect to FIG. 6.

The control matrix 500 controls an array of pixels 502 that includes light modulators having dual-actuator shutter assemblies 504. The actuators in the shutter assemblies 504 can be made either electrically bi-stable or mechanically bi-stable.

The control matrix 500 includes a scan-line interconnect 506 for each row of pixels 502 in the display apparatus 100 and a data interconnect 508 for each column of pixels 502. The scan-line interconnect 506 is configured to allow data to be loaded onto the pixel 502. The data interconnect 508 is configured to provide a data voltage corresponding to the data to be loaded on to the pixel 502. Further, the control matrix 500 includes an actuation voltage interconnect 510, a common source interconnect 512, a global update interconnect 514 and a shutter common interconnect 522 (collectively referred to as "common interconnects"). These common interconnects 510, 512, 514 and 516 are shared among pixels 502 in multiple rows and multiple columns in the array. In some implementations, the common interconnects 510, 512, 514 and 516 are shared among all pixels 502 in the display apparatus 100. These interconnects are configured to latch the pixel 502 to one of a first state and a second opposite state as well as to actuate the shutter assembly 504 of the pixel 502.

Each pixel 502 in the control matrix 500 also includes a write-enable transistor 531 and a data store capacitor 533. The gate of the write-enable transistor 531 is coupled to the scan-line interconnect 506 such that the scan-line interconnect 506 controls the write-enable transistor 531. The source of the write-enable transistor 531 is coupled to the data interconnect 508 and the drain of the write-enable transistor 531 is coupled to a first terminal of the data store capacitor 533 and an update transistor 521 described below. A second terminal of the data store capacitor 533 is coupled to the shutter common interconnect 516. In this way, as the write-enable transistor 531 is switched on via a write-enabling voltage provided by the scan-line interconnect 506, a data voltage provided by the data interconnect 508 passes through the write-enable transistor 531 and is stored at the data store capacitor 533. The stored data voltage is then used to latch the pixel 502 to one of a first pixel state or second pixel state.

The pixel 502 includes a latch circuit 540 that includes a first shutter-state inverter and a second shutter-state inverter. The first shutter-state inverter includes a first charge transistor 542 and a first discharge transistor 544. The second shutter-state inverter includes a second charge transistor 552 and a second discharge transistor 554. The first shutter-state inverter and the second shutter-state inverter are cross-coupled such that the inputs of the first shutter-state inverter are coupled to the outputs of the second shutter-state inverter and vice versa. In this way, the first shutter-state inverter and the second shutter-state inverter together operate as a latch or a flip flop circuit.

The gates of the first charge transistor 542 and the first discharge transistor 544 are coupled to the drains of the second charge transistor 552 and the second discharge transistor 554, while the gates of the second charge transistor 552 and the second discharge transistor 554 are coupled to the drains of the first charge transistor 542 and the first discharge transistor 544. The drain of the first charge transistor 542 connects to the drain of first discharge transistor 544 at a first shutter-state node 546. The drain of second charge transistor 552 connects to the drain of second discharge transistor 554 at a second shutter-state node 556. As such, the first shutter-state node 546 controls the gate voltage of both the first charge transistor 552 and the second discharge transistor 554 of the second shutter-state inverter and the second shutter-state node 556 controls the gate voltage of both of the first charge transistor 542 and the first discharge transistor 544 of the first shutter-state inverter. The source terminals of the first charge transistor 542 and the second charge transistor 552 are coupled to the actuation voltage interconnect 510. The source terminals of the first discharge transistor 544 and the second discharge transistor 554 are coupled to the common source interconnect 512.

The dual-actuator shutter assembly 504 of the pixel 502 includes a first shutter-state actuator that is coupled to the first shutter-state node 546 and a second shutter-state actuator that is coupled to the second shutter-state node 556. A reference electrode of the shutter assembly 504 is coupled to the shutter common interconnect 516. In some implementations, when the voltage at the first shutter-state node 546 is substantially higher than the voltage at the reference electrode, the shutter assembly 504 and the pixel 502 are in the first state. Conversely, when the voltage at the second shutter-state node 556 is substantially higher than the voltage at the reference electrode, the shutter assembly 504 and the pixel 502 are in the second state.

The pixel 502 further includes the update transistor 521 that couples the data store capacitor 533 to the latch circuit 540. The update transistor 521 is a pMOS transistor. The update transistor 521 is configured to electrically isolate the voltage on the data store capacitor 533 from voltages on the latch circuit 540. Specifically, the source of the update transistor 521 is coupled to the first terminal of the data store capacitor 533 and the drain of the write-enable transistor 531. The gate of the update transistor 521 is coupled to the global update interconnect 514 and the drain of the update transistor 521 is coupled to the first charging transistor 542 and the first discharging transistor 544 of the latch circuit 540.

The control matrix 500 makes use of two complementary types of transistors, both pMOS and nMOS transistors. It is therefore referred to as a complementary metal-oxide semiconductor (CMOS) control matrix. The update transistor 521 and the charging transistors 542 and 552, for example, are pMOS transistors, while the discharge transistors 544 and 554, among others, are nMOS transistors. In other implementations, the types of transistors employed in control matrix 500 can be reversed. For example, nMOS transistors can be used for the charging transistors and pMOS transistors can be used for the discharge transistors. Likewise, the update transistor 521 can be implemented with an nMOS transistor in some other implementations. In particular, the nMOS transistor may be coupled to the actuation voltage interconnect 510 via an inverter, or to another interconnect.

Figure 6:
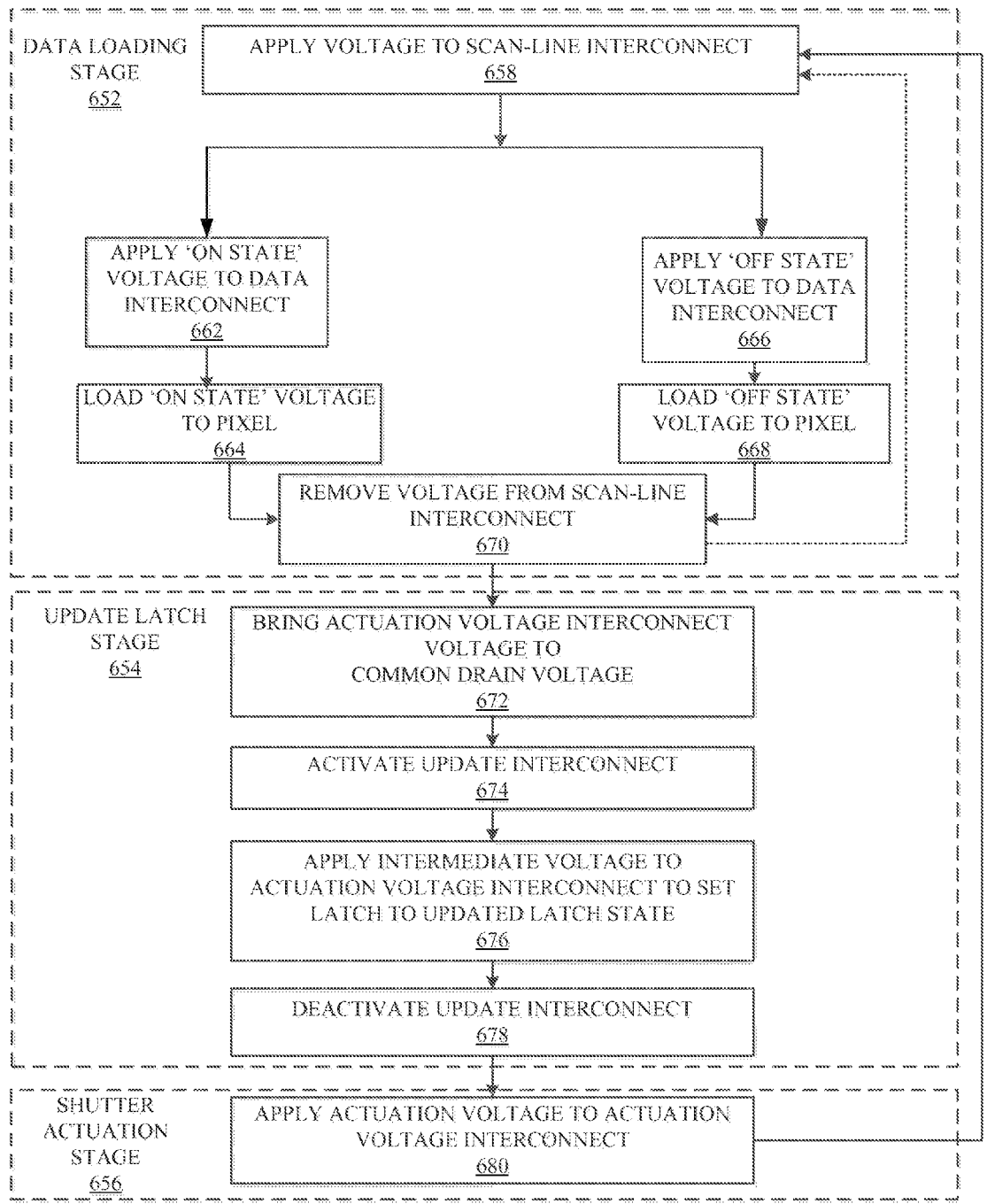
FIG. 6 shows a flow diagram of an example frame addressing and pixel actuation method.

FIG. 6 shows a flow diagram of an example frame addressing and pixel actuation method 600. The method 600 may be employed, for example, to operate the control matrix 500 of FIG. 5. The frame addressing and pixel actuation method 600 proceeds in three general stages. First, data voltages for pixels in a display are loaded for each pixel one row at a time in a data loading stage (block 652). Next, in an update latch stage, a latch for each pixel is set to the appropriate state based at least in part on the stored data voltage (block 654). Upon setting the latch for each pixel, the pixels are actuated in a shutter actuation stage (block 656). Although the frame addressing and pixel actuation method 600 is described in detail with respect to FIG. 5, some or all of the operations of the method 600 are employed to operate other control matrix implementations, such as the control matrices 700, 800, 1000, 1100 and 1200 depicted in FIGS. 7, 8, 10, 11 and 12. Furthermore, in some control matrix implementations, the update latch stage (block 654) may be performed differently than as described herewith respect to the control matrix 500 depicted in FIG. 5. Such differences will be described below with respect to descriptions of each of control matrices 700, 800, 1000, 1100 and 1200.

Referring now to both FIGS. 5 and 6, the data loading stage (block 652) for addressing each of the pixels of a particular row of the array proceeds with applying a write-enabling voltage $V_{we}$ to one of the rows of the array of pixels (block 658). The control matrix 500 applies the write-enabling voltage $V_{we}$ to the scan-line interconnect 506 corresponding to the row (block 658) such that the scan-line interconnect 506 is write-enabled. The application of a write-enabling voltage $V_{we}$ to the scan-line interconnect 506 for the write-enabled row turns on the write-enable transistors, such as write-enable transistor 531, of all pixels in the row.

Based on if the pixel state received by the control matrix is ON or OFF, the control matrix proceeds with either loading an ON voltage to the pixel 502 (blocks 662 and 664) or loading an OFF voltage to the pixel 502 (blocks 666 and 668). If the pixel 502 is to assume an ON state, the control matrix 500 loads an ON state voltage to the pixel 502 (block 662). In some implementations, the control matrix 500 loads the ON voltage by applying a data voltage ($V_d$), for example 5V, to the data interconnect 508 corresponding to the column in which that pixel 502 is located. The data voltage $V_d$ applied to the data interconnect 508 is caused to be stored as a charge on the data store capacitor 533 of the selected pixel 502 (block 664). That is, because the write-enable transistor 531 is switched on when the data voltage $V_d$ is applied to the data interconnect 508, the data voltage $V_d$ passes through the write-enable transistor 531 to the data store capacitor 533 on which it is stored as a charge.

If the pixel 502 is to assume an OFF state, the control matrix 500 loads an OFF voltage on to the pixel 502 (block 666). In some implementations, the control matrix 500 loads the OFF voltage by grounding the data interconnect 508 corresponding to the column in which that pixel 502 is located (block 668). In some implementations, since the data interconnect 508 is grounded, there is no data voltage $V_d$ and therefore, no charge is stored on the data store capacitor 533.

The process of loading data can be performed simultaneously in each of the pixels in the row that is write-enabled. In this way, the control matrix 500 selectively applies the data voltage to columns of a given row in the control matrix 500 at the same time while that row has been write-enabled. In some implementations, the control matrix 500 only applies the data voltage to those columns that are to be actuated towards the first shutter-state. Once all the pixels in the row are addressed, the control matrix 500 removes the write-enabling voltage $V_{we}$ from the scan-line interconnect 506 (block 670). In some implementations, the control matrix 500 grounds the scan-line interconnect 506. The data loading stage 652 is then repeated for subsequent rows of the array in the control matrix 500. At the end of the data loading sequence 652, each of the data store capacitors in the selected group of pixels contains the data voltage which is appropriate for the setting of the next image state.

The control matrix 500 then proceeds with the update latch stage 654 to set the latch circuits of the pixels to the next state. The update latch stage 654 begins by bringing the voltage on the actuation voltage interconnect 510 down to, or close to, the voltage on the common source interconnect 512 (block 672). By doing so, the voltages on both the first shutter-state node 546 and the second shutter-state node 556 are brought down close to the same voltage as the common source interconnect 512. The control matrix 500 then activates the global update interconnect 514 (block 674). In some implementations, the global update interconnect 514 is activated by grounding the global update interconnect 514 to switch the update transistor 521 to a conductive state. This allows the data voltage stored on the data store capacitor 533 to be passed from the data store capacitor 533 to the gates of the first charge transistor 542 and the first discharge transistor 544 of the cross-coupled inverter latch circuit 540. If the global update interconnect 514 is activated (block 674) too soon after the actuation voltage interconnect 510 voltage is brought to the common source interconnect voltage (block 672), the stored data voltage corresponding to a subsequent state of the pixel at the data store capacitor 533 can be corrupted by present pixel state data on the latch circuit 540 that has not had enough time to decay away. Therefore, a delay between bringing the actuation voltage interconnect 510 voltage down to the common source interconnect voltage (block 672) and activating the global update interconnect 514 (block 674) may be useful to prevent the data stored at the data store capacitor 533 from being corrupted. The length of this delay can be a function of circuit parasitics, transistor threshold voltages, capacitor size and stored data voltage levels. For example, the length of the delay may be approximately 10 µs. It may be appreciated that this delay length may be considerably longer or shorter depending on the display.

An intermediate voltage just high enough to make the latch circuit 540 update is applied to the actuation voltage interconnect 510 (block 676). In some implementations, the intermediate voltage can be approximately equal to the sum of the threshold voltages of the first charge transistor 542 and the first discharge transistor 544 or the second charge transistor 552 and the second discharge transistor 554. In some implementations, the intermediate voltage can be significantly less than the sum of the threshold voltages of the first charge transistor 542 and the first discharge transistor 544 or the second charge transistor 552 and the second discharge transistor 554 depending on various factors, such as the length of the delay between bringing the actuation voltage interconnect voltage down to the common source interconnect voltage (block 672) and activating the global update interconnect 514 (block 674). Other factors can include parasitic charge injections and detailed transistor characteristics, amongst others. The intermediate voltage is typically substantially less than the actuation voltage $V_{at}$. In some implementations, the intermediate voltage can be just high enough such that the voltage stored on the data store capacitor 533 is effective for setting the latch circuit 540 into its next state appropriate for the next shutter position. For example, the intermediate voltage can be between the range of about 1-6V. A reduced intermediate voltage also reduces the power consumed by switching transients which occur during the update of the latch circuit 540. In some implementations, the latch circuit 540 is latched at as low an intermediate voltage level as can be reliably performed such that transient switching power is reduced. By activating the global update interconnect 514 (block 674) and applying a requisite intermediate voltage to the actuation voltage interconnect 510 (block 676), the voltage stored on the data store capacitor 533 can be latched into the first shutter-state inverter of the latch circuit 540. The application of a requisite intermediate voltage (block 676) can be performed simultaneously to, before or after activating the global update interconnect 514 (block 674).

Finally, the global update interconnect 514 is deactivated (block 678). In some implementations, the global update interconnect 514 is deactivated by applying a voltage to the global update interconnect 514 such that the update transistor 521 is switched to a non-conductive state. In this way, the data store capacitor 533 is isolated from the latch circuit 540 of pixel 502. One benefit of isolating the data store capacitor 533 from the latch circuit 540 is a reduction in power consumption. This is because any increase in voltage being applied to the actuation voltage interconnect 510 does not automatically charge the data store capacitor 533 to the increased applied voltage.

Once the update latch stage (block 654) is complete, the control matrix 500 proceeds with the shutter actuation stage (block 656). In this stage, the actuation voltage $V_{at}$ is applied to the actuation voltage interconnect 510 (block 680). The actuation voltage is the voltage sufficient to actuate the shutter assembly 504 of the pixel 502 to assume one state or the other, or alternatively, to hold the shutter assembly 504 in the same state throughout a subsequent data loading cycle. In some implementations, after the shutter assembly 504 is actuated by the application of the actuation voltage $V_{at}$, a voltage less than the actuation voltage $V_{at}$ but greater than a maintenance voltage $V_m$ is applied to the actuation voltage interconnect 510 to hold the shutter assembly 504 throughout a subsequent data loading cycle.

Because the latch circuit was previously updated during the update latch stage (block 654), there is no conduction path from the actuation voltage interconnect 510 through the first charge transistor 542 and the first discharge transistor 544 or the second charge transistor 552 and the second discharge transistor 554. During actuation at the shutter actuation stage (block 656), only the currents needed to sustain voltages across the shutter actuators and various other parasitic capacitances are allowed to flow, resulting in reduced power dissipation. After the shutter assemblies, such as shutter assembly 504, of the pixels are actuated (block 656), the method 600 returns to the beginning of the data loading stage (block 652).

In control matrix 500, the first shutter-state inverter can be referred to as the master inverter. This is because the state of the first shutter-state inverter is controlled directly by the data store capacitor 533 during the latch update stage (block 654). The second shutter-state inverter can be referred to as the slave inverter because the state of the slave is controlled by the output of the first shutter-state inverter. Conversely, in some implementations, the control matrix 500 could be configured or mirrored such that the output of the first shutter-state inverter determines the voltage of the second shutter-state actuator of shutter assembly 504, and such that the output of the second shutter-state inverter determines the voltage of the first shutter-state actuator of the shutter assembly 504.

For high voltage applications, a more reliable implementation of control matrix 500 may include additional transistors in a cascode configuration, whose operation would be similar to the cascode transistors described below with respect to FIG. 12.

In some implementations, it is possible to apply the method 600 to a selected portion of the whole array of pixels, since it may be advantageous to update different areas or groupings of rows and columns in series. In such implementations, a number of different actuation voltage interconnects, such as the actuation voltage interconnect 510, and update interconnects, such as the update interconnects 514, are routed to selected portions of the array for selectively updating and actuating different portions of the array.

As described above, to address the pixels 502 in the control matrix 500, the data voltage $V_d$ can be significantly less than the actuation voltage $V_{at}$. For example, the data voltage $V_d$ can be about 5V while the actuation voltage $V_{at}$ can be about 40V. In some implementations, the data voltage $V_d$ may be about 3V while the actuation voltage is less than or equal to about 25V. Since the actuation voltage $V_{at}$ is applied once a frame, whereas the data voltage $V_d$ may be applied to each data interconnect 508 as may times per frame as there are rows in the control matrix 500, control matrices such as control matrix 500 may save a substantial amount of power in comparison to control matrices which require a data voltage to be high enough to also serve as the actuation voltage.

Figure 7:
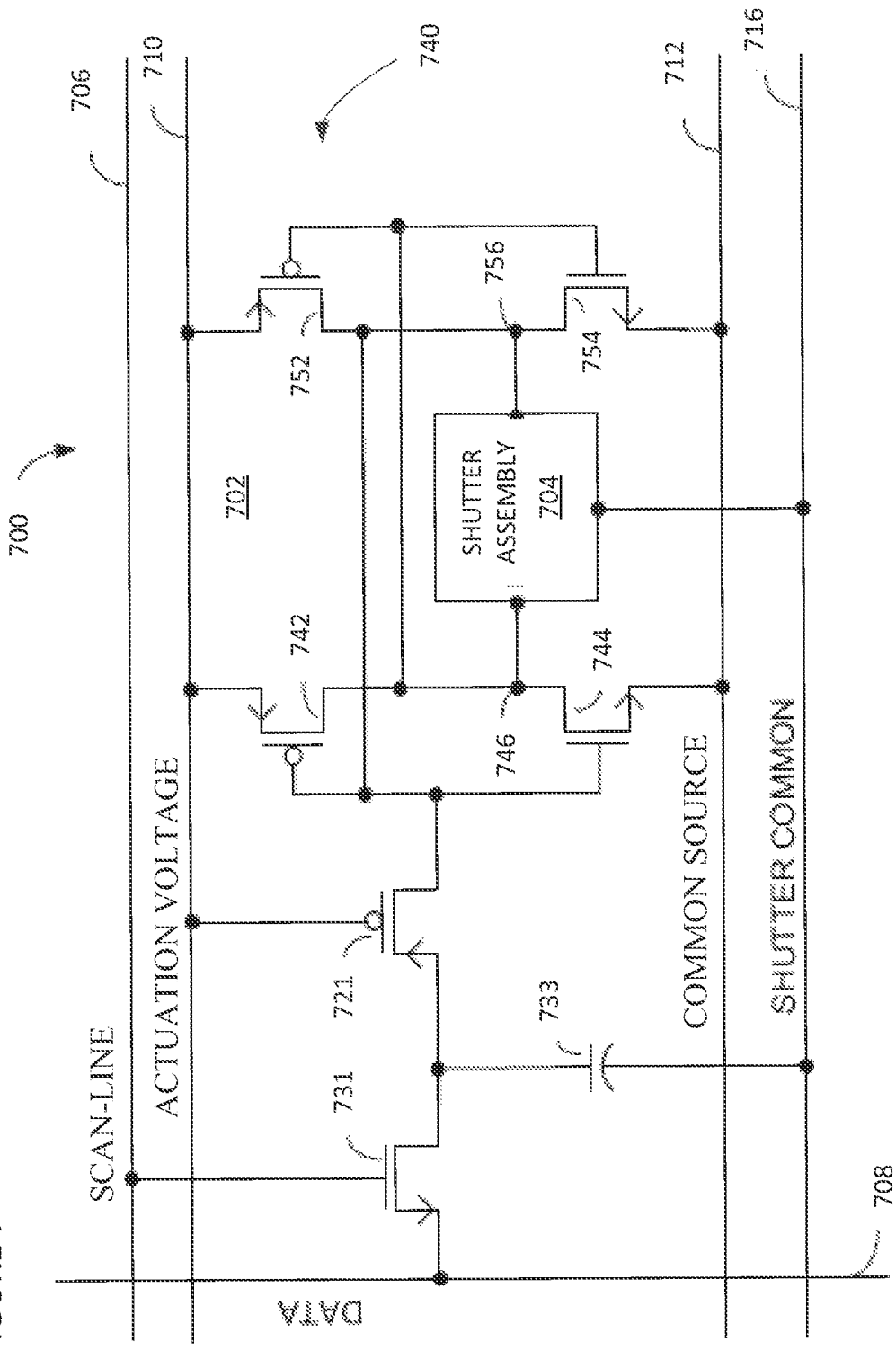
FIG. 7 shows a portion of an example control matrix.

FIG. 7 shows a portion of a control matrix 700. The control matrix 700 can be implemented for use in the display apparatus 100 depicted in FIG. 1. The control matrix 700 is substantially similar to the control matrix 500 depicted in FIG. 5. However, the control matrix 700 differs from the control matrix 500 in that the configuration and operation of the update transistor 721 is different from the configuration and operation of the update transistor 521 depicted in FIG. 5. In addition, the control matrix 700 also includes one less common interconnect as compared to control matrix 500.

The control matrix 700 controls an array of pixels 702 that includes light modulators having dual-actuator shutter assemblies 704. The actuators in the shutter assemblies 704 can be made either electrically bi-stable or mechanically bi-stable.

The control matrix 700 includes a scan-line interconnect 706 for each row of pixels 702 in the control matrix 700 and a data interconnect 708 for each column of pixels 702. The control matrix 700 further includes an actuation voltage interconnect 710, a common source interconnect 712, and a shutter common interconnect 716 (collectively referred to as "common interconnects"). These common interconnects 710, 712 and 716 are shared among pixels 702 in multiple rows and multiple columns in the array. In some implementations, the common interconnects 710, 712 and 716 are shared among all pixels 702 in the display apparatus 100.

Each pixel 702 in the control matrix 700 also includes a write-enable transistor 731 and a data store capacitor 733. The gate of the write-enable transistor 731 is coupled to the scan-line interconnect 706 and the source of the write-enable transistor 731 is coupled to the data interconnect 708. The drain of the write-enable transistor 731 is coupled to a first terminal of the data store capacitor 733 and inputs of a latch circuit 740 described below. A second terminal of the data store capacitor 733 is coupled to the shutter common interconnect 716.

The control matrix 700 further includes the latch circuit 740 similar to the latch circuit 540 depicted in FIG. 5. The latch circuit 740 includes a first shutter-state inverter and a second shutter-state inverter. The first shutter-state inverter includes a first charge transistor 742 and a first discharge transistor 744. The second shutter-state inverter includes a second charge transistor 772 and a second discharge transistor 774. The first shutter-state inverter and the second shutter-state inverter are cross-coupled such that the inputs of the first shutter-state inverter are coupled to the outputs of the second shutter-state inverter and vice versa. In this way, the first shutter-state inverter and the second shutter-state inverter together operate as a latch or a flip flop circuit.

The gates of the first charge transistor 742 and the first discharge transistor 744 are coupled to the drains of the second charge transistor 752 and second discharge transistor 754, while the gates of the second charge transistor 752 and second discharge transistor 754 are coupled to the drains of the first charge transistor 742 and the first discharge transistor 744. The drain of first charge transistor 742 connects to the drain of first discharge transistor 744 at a first shutter-state node 746. The drain of second charge transistor 752 connects to the drain of second discharge transistor 754 at a second shutter-state node 756. As such, the first shutter-state node 746 controls the gate voltage of both the second charge transistor 752 and second discharge transistor 754 of the second shutter-state inverter and the second shutter-state node 756 controls the gate voltage of both of the first charge transistor 742 and first discharge transistor 744 of the first shutter-state inverter. The source terminals of the first charge transistor 742 and second charge transistor 752 are coupled to the actuation voltage interconnect 710. The source terminals of the first discharge transistor 744 and second discharge transistor 754 are coupled to the common source interconnect 712.

The dual-actuator shutter assembly 704 of the pixel 702 includes a first shutter-state actuator that is coupled to the first shutter-state node 746 and a second shutter-state actuator that is coupled to the second shutter-state node 756. A reference electrode of the shutter assembly 704 is coupled to the shutter common interconnect 716.

The pixel 702 further includes an update transistor 721 that couples the data store capacitor 733 to the latch circuit 740. In some implementations, the update transistor 721 is a pMOS transistor. Similar to the update transistor 521 depicted in FIG. 5, the source of the update transistor 721 is coupled to the first terminal of the data store capacitor 733 and the drain of the write-enable transistor 731. The drain of the update transistor 721 is coupled to inputs of the latch circuit 740. In contrast to the configuration of the update transistor 521 depicted in FIG. 5, the gate of the update transistor 721 is coupled to the actuation voltage interconnect 710 instead of a global update interconnect, such as the global update interconnect 514 depicted in FIG. 5.

The control matrix 700 operates in a manner substantially similar to the control matrix 500 depicted in FIG. 5. Generally, the control matrix 700 performs a frame addressing and pixel actuation method similar to the frame addressing and pixel actuation method 600 described with respect to FIG. 6. The frame addressing and pixel actuation method utilized for the controlling the control matrix 700 proceeds in three general stages. First, data voltages corresponding to the pixels are loaded for each pixel one row at a time in a data loading stage. Next, in an update latch stage, the latch for each pixel is set to the appropriate state based at least in part on the stored data voltage. Upon setting the latch for each pixel, the pixels are actuated in a shutter actuation stage.

The operation of the control matrix 700 begins with the data loading stage and proceeds to the update latch stage. In this stage, the control matrix 700 brings the actuation voltage interconnect voltage down to the common source voltage. As soon as the actuation voltage interconnect 710 voltage is brought to a voltage equal to or less than the voltage of the common source interconnect 712, the update transistor 721 automatically switches to the conductive state. As a result, the data voltage stored on the data store capacitor 733 is transferred to the gates of the first charge transistor 742 and the first discharge transistor 744 of the latch circuit 740. Since the update transistor 721 automatically switches to the conductive state as the voltage on the actuation voltage interconnect 710 falls below a threshold voltage, the control matrix 700 lacks a global update interconnect for controlling the update transistor 721 altogether. In this way, the control matrix 700 consumes less area than the control matrix 500 depicted in FIG. 5 and reclaims valuable substrate real estate by having one less common interconnect than the control matrix 500.

After the update transistor 721 is switched to the ON state and the data voltage stored on the data store capacitor 733 is transferred to the gates of the first charge transistor 742 and the first discharge transistor 744 of the latch circuit 740, the actuation voltage interconnect 710 is brought to an intermediate voltage. In this way, the update transistor 721 returns to the OFF state and the latch circuit 740 is updated with a new latch state. Further, once the update transistor 721 is switched to the OFF state, the data store capacitor 733 is electrically isolated from the latch circuit 740 and the transient currents in the latch circuit 740 are reduced to zero. The update latch stage then proceeds to the shutter actuation stage, where the actuation voltage interconnect 710 is raised to the actuation voltage $V_{at}$ and the shutter assembly 704 is caused to actuate to its new state.

Figure 8:
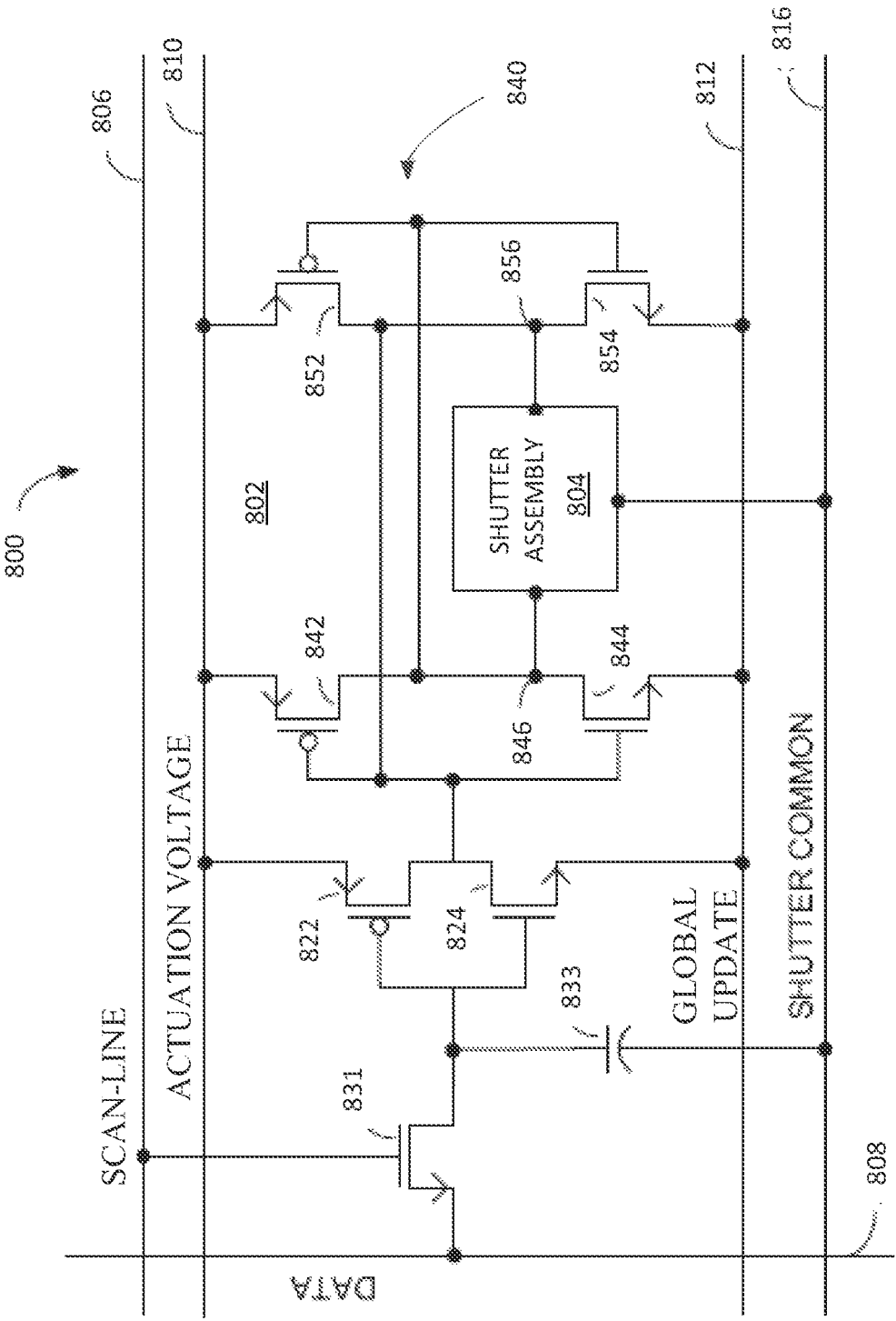
FIG. 8 shows a portion of an example control matrix.

FIG. 8 shows a portion of a control matrix 800. The control matrix 800 can be implemented for use in the display apparatus 100 depicted in FIG. 1. The control matrix 800 is substantially similar to the control matrix 500 depicted in FIG. 5. However, instead of utilizing an update transistor, such as the update transistor 521 depicted in FIG. 5, the control matrix 800 includes a CMOS inverter that includes an update charge transistor 822 and an update discharge transistor 824. In this configuration, the control matrix 800 includes one less common interconnect compared to the control matrix 500, thereby reclaiming valuable substrate real estate.

The control matrix 800 controls an array of pixels 802 that include light modulators having dual-actuator shutter assemblies 804. The actuators in the shutter assemblies 804 can be made either electrically bi-stable or mechanically bi-stable.

The control matrix 800 includes a scan-line interconnect 806 for each row of pixels 802 in the control matrix 800 and a data interconnect 808 for each column of pixels 802. The control matrix 800 further includes an actuation voltage interconnect 810, a global update interconnect 812, and a shutter common interconnect 816 (collectively referred to as "common interconnects"). These common interconnects 810, 812 and 816 are shared among pixels 802 in multiple rows and multiple columns in the array. In some implementations, the common interconnects 810, 812 and 816 are shared among all pixels 802 in the display apparatus 100 depicted in FIG. 1. In contrast to the control matrix 700 depicted in FIG. 7, the control matrix 800 includes a global update interconnect 812 instead of a common source interconnect, such as the common source interconnect 712 depicted in FIG. 7.

Each pixel 802 in the control matrix 800 also includes a write-enable transistor 831 and a data store capacitor 833. The gate of the write-enable transistor 831 is coupled to the scan-line interconnect 806 and the source of the data load transistor 831 is coupled to the data interconnect 808. The drain of the write-enable transistor 831 is coupled to a first terminal of the data store capacitor 833 and inputs of the CMOS inverter described below. A second terminal of the data store capacitor 833 is coupled to the shutter common interconnect 816.

The control matrix 800 further includes a latch circuit 840 similar to the latch circuit 540 depicted in FIG. 5. The latch circuit 840 includes a first shutter-state inverter and a second shutter-state inverter. The first shutter-state inverter includes a first charge transistor 842 and a first discharge transistor 844. The second shutter-state inverter includes a second charge transistor 852 and a second discharge transistor 854. The first shutter-state inverter and the second shutter-state inverter are cross-coupled such that the inputs of the first shutter-state inverter are coupled to the outputs of the second shutter-state inverter and vice versa. In this way, the first shutter-state inverter and the second shutter-state inverter together operate as a latch or a flip flop circuit.

The gates of the first charge transistor 842 and the first discharge transistor 844 are coupled to the drains of the second charge transistor 852 and the second discharge transistor 854, while the gates of the second charge transistor 852 and the second discharge transistor 854 are coupled to the drains of the first charge transistor 842 and the first discharge transistor 844. The drain of first charge transistor 842 connects to the drain of the first discharge transistor 844 at a first shutter-state node 846. The drain of the second charge transistor 852 connects to the drain of the second discharge transistor 854 at a second shutter-state node 856. As such, the first shutter-state node 846 controls the gate voltage of both the second charge transistor 852 and the second discharge transistor 854 of the second shutter-state inverter and the second shutter-state node 856 controls the gate voltage of both of the first charge transistor 842 and the first discharge transistor 844 of the first shutter-state inverter. The source terminals of the first charge transistor 842 and second charge transistor 852 are coupled to the actuation voltage interconnect 810. The source terminals of the first discharge transistor 844 and the second discharge transistor 854 are coupled to the global update interconnect 812.

The dual-actuator shutter assembly 804 of the pixel 802 includes a first shutter-state actuator that is coupled to the first shutter-state node 846 and a second shutter-state actuator that is coupled to the second shutter-state node 856. A reference electrode of the shutter assembly 804 is coupled to the shutter common interconnect 816.

As described above, the control matrix 800 differs from the control matrix 500 that includes the update transistor 521 depicted in FIG. 5 in that the control matrix 800 includes a CMOS inverter that functions to isolate the voltage on the data store capacitor 833 from the voltages on the latch circuit 840. The inverter includes the update charge transistor 822 and the update discharge transistor 824. The gates of both the update charge transistor 822 and the update discharge transistor 824 are connected to the data store capacitor 833 as well as to the drain of the write-enable transistor 831. The source of the update charge transistor 822 is connected to the actuation voltage interconnect 810 and the source of the update discharge transistor 824 is coupled to the common drain interconnect 812. The drain terminals of both the update charge transistor 822 and the update discharge transistor 824 are coupled together and form the output of the inverter. This output is connected to the input gate terminals of the first charge transistor 842 and the first discharge transistor 844 of the latch circuit 840. In some implementations, the update charge transistor 822 is of the same type as the first charge transistor 842 and second charge transistor 852 of the latch circuit 840. That is, the update charge transistor 822 is a pMOS transistor. Conversely, the update discharge transistor 824 is of the same type as the first discharge transistor 844 and the second discharge transistor 854 of the latch circuit 840. That is, the update discharge transistor 824 is an nMOS transistor.

The control matrix 800 operates in a way substantially similar to the control matrix 500 depicted in FIG. 5. Generally, the control matrix 800 performs a frame addressing and pixel actuation method similar to the frame addressing and pixel actuation method 600 described with respect to FIG. 6. The frame addressing and pixel actuation method utilized for the controlling the control matrix 800 proceeds in three general stages. First, data voltages corresponding to the pixels are loaded for each pixel one row at a time in a data loading stage. Next, in an update latch stage, the latch for each pixel is set to the appropriate state based at least in part on the stored data voltage. Upon setting the latch for each pixel, the pixels are actuated in a shutter actuation stage.

The operation of the control matrix 800 begins with the data loading stage and proceeds to the update latch stage. In this stage, the control matrix 800 reduces the voltage on the actuation voltage interconnect 810. For control matrix 800, it is sufficient to reduce the voltage on the actuation voltage interconnect 810 to a voltage substantially similar to that of the data voltage provided by the data interconnect 808 without completely discharging the voltage stored on the latch circuit 840. For example, it is sufficient to reduce the voltage on the actuation voltage interconnect 810 to a voltage in the range of about 2-8V. This intermediate voltage is effective in preparing the update latch stage because of the high impedance which remains between the latch circuit 840 and the data store capacitor 833.

The global update interconnect 812 is then activated. The global update interconnect 812 is activated by reducing the voltage on the global update interconnect 812 from a voltage that is substantially the same as the data voltage down to a voltage near zero. This reduction in voltage of the global update interconnect 812 causes the discharge transistor 824, the first discharge transistor 844, and the second discharge transistor 854 to switch on and thereby respond to the data voltage stored on the data store capacitor 833.

After the global update interconnect 812 is activated, the voltage on the actuation voltage interconnect 812 is raised to an intermediate voltage. This causes the latch circuit 840 to be set with the new latch state. After the latch state has been set, the global update interconnect 812 is then returned from a voltage at or near zero volts to a voltage that is substantially equal to the data voltage. Additional details of the timing of voltage changes is shown in FIG. 9, which will be described below.

After the global update interconnect voltage is returned to at or near the data voltage, the discharge transistor 824, the first discharge transistor 844 and the second discharge transistor 854 are returned to the OFF state and the latch circuit 840 again becomes electrically isolated from the data store capacitor 833. The update latch stage then proceeds to the shutter actuation stage, where the actuation voltage interconnect 810 is raised to the actuation voltage $V_{at}$ and the shutter assembly 804 is caused to actuate to its new state.

Figure 9:
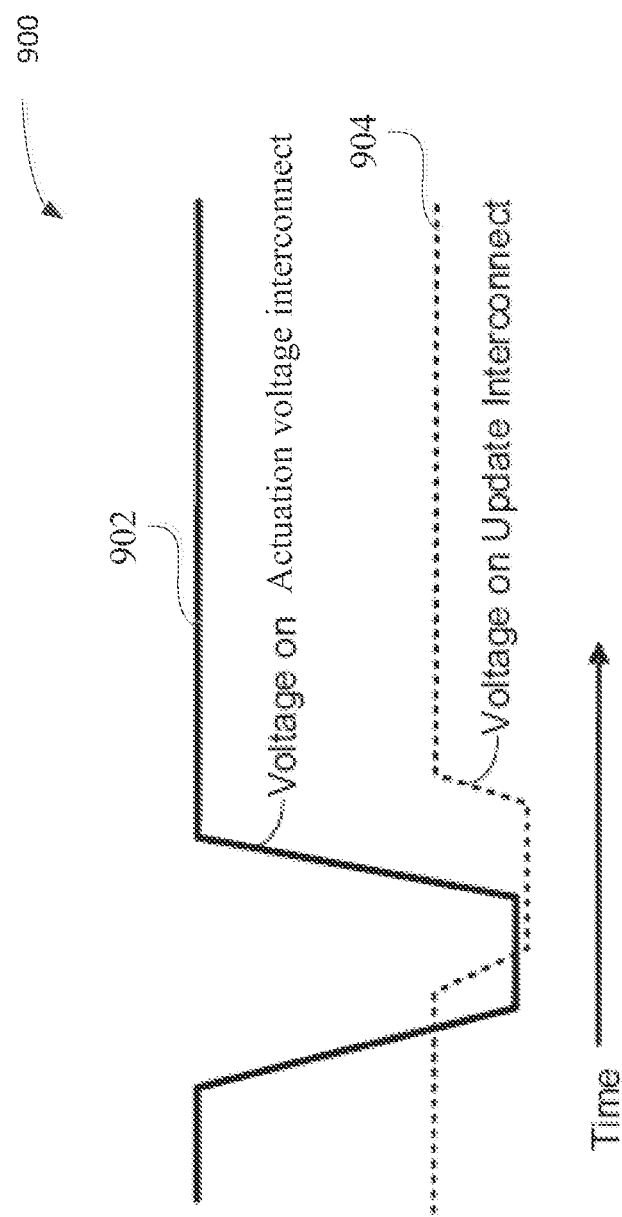
FIG. 9 shows a timing diagram of an example voltages applied to an actuation voltage interconnect and a global update interconnect.

FIG. 9 shows a timing diagram 900 of example voltages applied to an actuation voltage interconnect and a global update interconnect, such as interconnects 810 and 812, respectively, in FIG. 8. The timing diagram 900 corresponds to the frame addressing and pixel actuation method described with respect to the control matrix 800 depicted in FIG. 8. As described above, the control matrix 800 reduces the voltage on the actuation voltage interconnect 810 to a voltage substantially similar to that of the data voltage provided by the data interconnect 808. This is depicted by the voltage line 902. The global update interconnect 812 is then activated by reducing the voltage on the global update interconnect 812 from a voltage that is substantially the same as the data voltage down to a voltage near zero, as depicted by voltage line 904. If the global update interconnect 812 is activated too soon after the actuation voltage interconnect 810 voltage is reduced, the data voltage corresponding to a subsequent state of the pixel stored on the data store capacitor 833 can be corrupted by present pixel state data of the latch circuit 840 that has not had enough time to decay away. Therefore, a delay between reducing the actuation voltage interconnect 810 voltage and activating the global update interconnect 812 may be useful. After the global update interconnect 812 is activated, the voltage on the actuation voltage interconnect 812 is raised to set the latch circuit 840. After the latch state has been set, the global update interconnect 812 is then returned from a voltage at or near zero volts to a voltage that is substantially equal to the data voltage.

Generally, a latch circuit includes a first inverter coupled to a second inverter such that the output of one inverter is coupled to the input of the other inverter. In some implementations, a control matrix may employ the use of a half-latch circuit. A half-latch circuit is a latch circuit in which at least one of the transistor gate of one of the inverters of the latch is disconnected from the output of the other inverter making up the latch. The half-latch circuit has the advantage that charges at the disconnected input are shielded from any transient currents which may flow through the latch circuit during a latch update stage. In some implementations, a half-latch circuit may be asymmetric. This is, the inputs of the first inverter and the second inverter do not receive complementary data inputs during the latch update stage.

Figure 10:
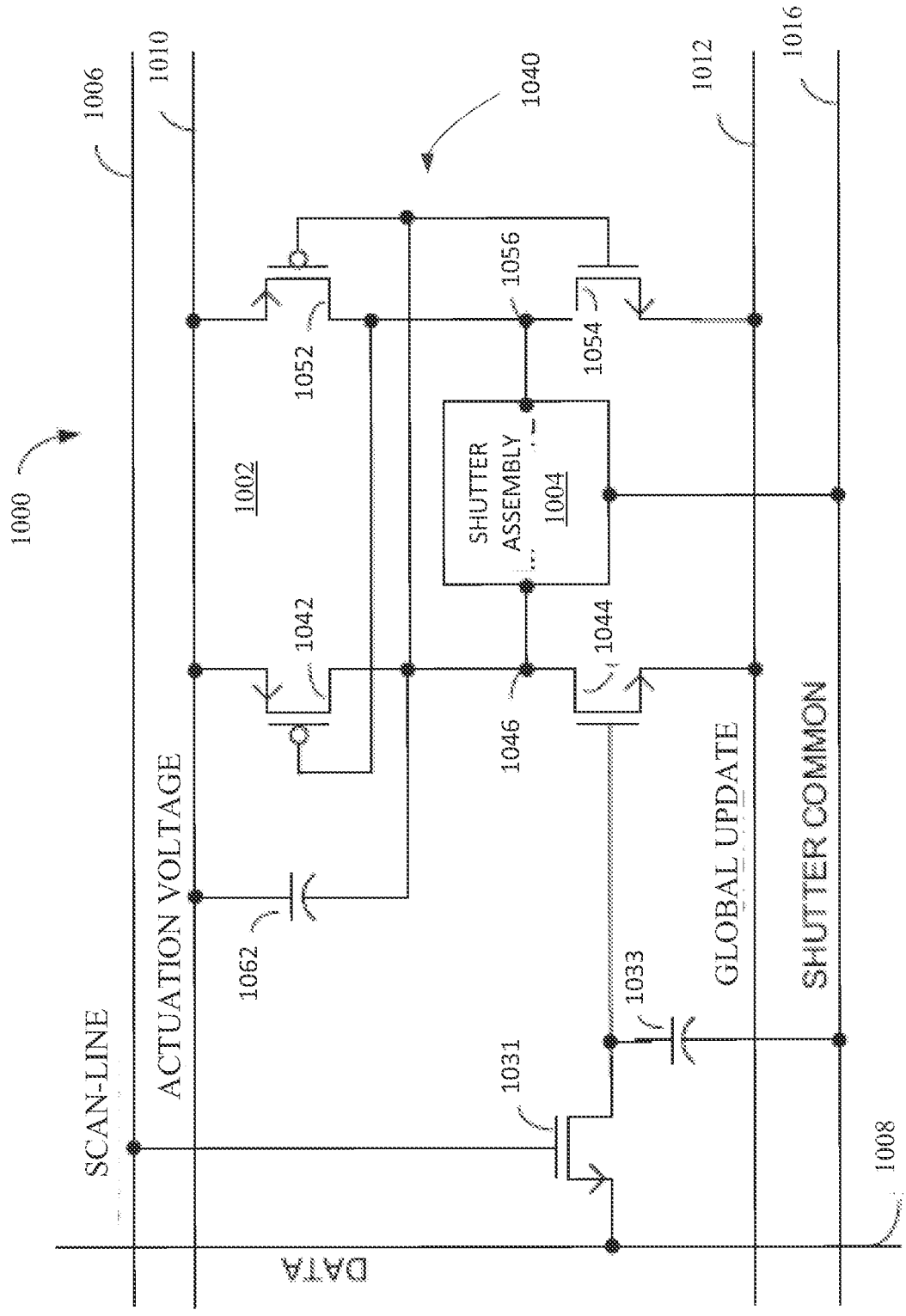
FIG. 10 shows a portion of an example control matrix.

FIG. 10 shows a portion of a control matrix 1000. The control matrix 1000 can be implemented for use in the display apparatus 100 depicted in FIG. 1. The control matrix 1000 is substantially similar to the control matrix 500 depicted in FIG. 5. However, instead of utilizing an update transistor and an associated update interconnect, such as the update transistor 521 and its associated update interconnect 514 depicted in FIG. 5, the control matrix 1000 instead includes an asymmetric latch circuit 1040.

The control matrix 1000 controls an array of pixels 1002 that includes light modulators having dual-actuator shutter assemblies 1004. The actuators in the shutter assemblies 1004 can be made either electrically bi-stable or mechanically bi-stable.

The control matrix 1000 includes a scan-line interconnect 1006 for each row of pixels 1002 in the control matrix 1000 and a data interconnect 1008 for each column of pixels 1002. The control matrix 1000 further includes an actuation voltage interconnect 1010, a global update interconnect 1012, and a shutter common interconnect 1016 (collectively referred to as "common interconnects"). These common interconnects 1010, 1012 and 1016 are shared among pixels 1002 in multiple rows and multiple columns in the array. In some implementations, the common interconnects 1010, 1012 and 1016 are shared among all pixels 1002 in the array.

Each pixel 1002 in the control matrix 1000 also includes a write-enable transistor 1031 and a data store capacitor 1033. The gate of the write-enable transistor 1031 is coupled to the scan-line interconnect 1006, the source of the data load transistor 1031 is coupled to the data interconnect 1008 and the drain of the write-enable transistor 1031 is coupled to a first terminal of the data store capacitor 1033. A second terminal of the data store capacitor 1033 is coupled to the shutter common interconnect 1016.

The control matrix 1000 further includes a latch circuit 1040. The latch circuit 1040 includes a first shutter-state inverter and a second shutter-state inverter. The first shutter-state inverter includes a first charge transistor 1042 and a first discharge transistor 1044. The second shutter-state inverter includes a second charge transistor 1052 and a second discharge transistor 1054.

As described above, the latch circuit 1040 is a half-latch. As such, the gate of the first charge transistor 1042 is coupled to the drains of the second charge transistor 1052 and the second discharge transistor 1054, while the gate of the first discharge transistor 1044 is coupled to the data store capacitor 1033 and the drain of the write-enabling transistor 1031. The gates of the second charge transistor 1052 and the second discharge transistor 1054 are coupled to the drains of the first charge transistor 1042 and the first discharge transistor 1044. The drain of the first charge transistor 1042 connects to the drain of the first discharge transistor 1044 at a first shutter-state node 1046. The drain of the second charge transistor 1052 connects to the drain of the second discharge transistor 1054 at a second shutter-state node 1056. As such, the first shutter-state node 1046 controls the gate voltage of both the second charge transistor 1052 and the second discharge transistor 1054 of the second shutter-state inverter and the second shutter-state node 1056 controls the gate voltage of the first charge transistor 1042 of the first shutter-state inverter. The source terminals of the first charge transistor 1042 and the second charge transistor 1052 are coupled to the actuation voltage interconnect 1010. The source terminals of the first discharge transistor 1044 and the second discharge transistor 1054 are coupled to the global update interconnect 1012.

The dual-actuator shutter assembly 1004 of the pixel 1002 includes a first shutter-state actuator that is coupled to the node 1046 and a second shutter-state actuator that is coupled to the node 1056. A reference electrode of the shutter assembly 1004 is coupled to the shutter common interconnect 1016.

The control matrix 1000 further includes a pre-bias capacitor 1062 that has a first terminal connected to the actuation voltage interconnect 1010 and a second terminal connected to the first shutter-state node 1046 and the inputs of the second shutter-state inverter. The pre-bias capacitor 1062 is configured to pre-bias the shutter assembly 1004 to one of the first and second shutter states to prevent the latch circuit 1040 from settling in an indeterminate state. Additional details regarding why such a state may occur will become apparent during a discussion of the operation of the control matrix 1000 provided below.

The control matrix 1000 operates in a way substantially similar to the control matrix 500 depicted in FIG. 5. Generally, the control matrix 1000 performs a frame addressing and pixel actuation method similar to the frame addressing and pixel actuation method 600 described with respect to FIG. 6. The frame addressing and pixel actuation method utilized for controlling the control matrix 1000 proceeds in three general stages. First, data voltages corresponding to the pixels are loaded for each pixel one row at a time in a data loading stage. Next, in an update latch stage, the latch for each pixel is set to the appropriate state based at least in part on the stored data voltage. Upon setting the latch for each pixel, the pixels are actuated in a shutter actuation stage.

The operation of the control matrix 1000 begins with the data loading stage and proceeds to the update latch stage. In this stage, the control matrix 1000 reduces the voltage on the actuation voltage interconnect 1010. The control matrix 1000 activates the global update interconnect 1012 by reducing the voltage applied to the global update interconnect from a voltage near the data voltage to a voltage near zero. This reduction in voltage of the global update interconnect 1012 puts the first discharge transistor 1044 and the second discharge transistor 1054 in condition to respond to the data voltage stored on the data store capacitor 1033.

The voltage on the actuation voltage interconnect 1010 is then raised to an intermediate voltage or to the full actuation voltage. After the voltage on the actuation voltage interconnect 1010 reaches the desired voltage, the latch circuit 1040 is updated to the new latch state.

As the voltage on the actuation voltage interconnect 1010 is raised and if the first discharge transistor 1044 remains in the OFF state based on the data voltage stored on the data store capacitor 1033, then a voltage is transferred through the pre-bias capacitor 1062 and on to the first shutter-state node 1046. This voltage will be effective for setting the latch circuit 1040 into the first shutter-state. If the first discharge transistor 1044 is switched to the ON state based on the data voltage stored on the data store capacitor 1033, then the latch circuit 1040 is biased to the second shutter-state. If the first discharge transistor 1044 is switched to the ON state, the voltage at the first shutter-state node 1046 will be about the same as the global update interconnect 1012, which is low. As a result, a low voltage is applied at the gate of the second discharge transistor 1054. As a result, the voltage at the second shutter-state node 1056 is at a voltage that is higher than the voltage at the first shutter-state node 1046, thereby biasing the shutter assembly 1004 towards the second shutter state. In this way, a reliable 2-state latch operation is thereby achieved despite the asymmetrical construction of the latch circuit 1040.

After the voltage on the actuation voltage interconnect 1010 is raised to set the latch circuit 1040, the global update interconnect 1012 is then returned from a voltage at or near zero volts to a voltage that is substantially equal to the data voltage. The update latch stage then proceeds to the shutter actuation stage, where the actuation voltage interconnect 1010 is raised to the actuation voltage $V_{at}$ and the shutter assembly 1004 is caused to actuate to its new state.

Figure 11:
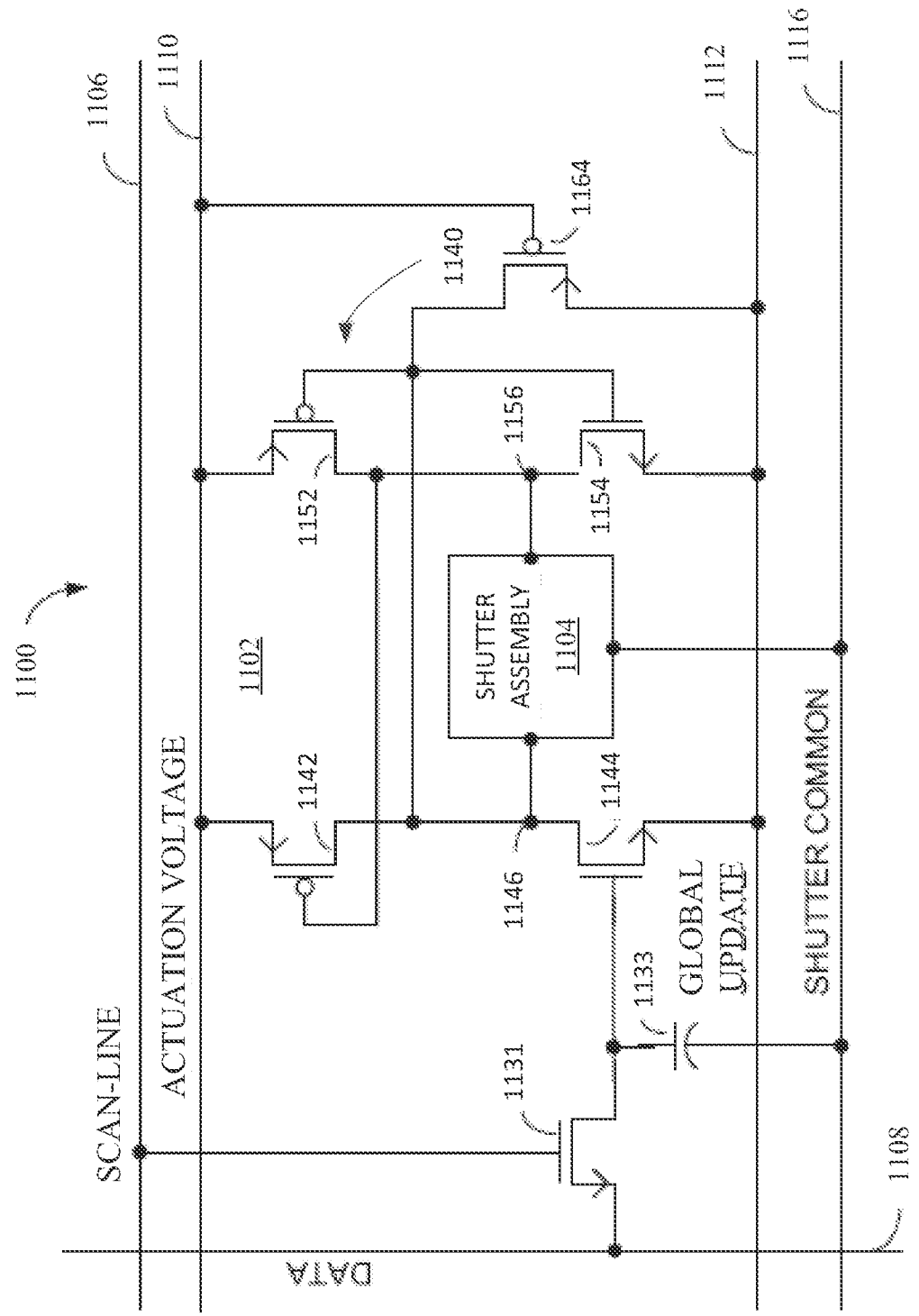
FIG. 11 shows a portion of an example control matrix.

FIG. 11 shows a portion of a control matrix 1100. The control matrix 1100 can be implemented for use in the display apparatus 100 depicted in FIG. 1. The control matrix 1100 is substantially similar to the control matrix 1000 depicted in FIG. 10. However, the control matrix 1100 differs from the control matrix 1000 in that the control matrix 1100 employs a pre-bias transistor 1164 instead of a pre-bias capacitor, such as the pre-bias capacitor 1062 depicted in FIG. 10. Similar to the pre-bias capacitor 1062, the pre-bias transistor 1164 depicted in FIG. 11 is employed to overcome the lack of data-input symmetry in an associated latch circuit 1140 of the control matrix 1100.

The control matrix 1100 controls an array of pixels 1102 that includes light modulators having dual-actuator shutter assemblies 1104. The actuators in the shutter assemblies 1104 can be made either electrically bi-stable or mechanically bi-stable.

The control matrix 1100 includes a scan-line interconnect 1106 for each row of pixels 1102 in the control matrix 1100 and a data interconnect 1108 for each column of pixels 1102. The control matrix 1100 further includes an actuation voltage interconnect 1110, a global update interconnect 1112, and a shutter common interconnect 1116 (collectively referred to as "common interconnects"). These common interconnects 1110, 1112 and 1116 are shared among pixels 1102 in multiple rows and multiple columns in the array. In some implementations, the common interconnects 1110, 1112 and 1116 are shared among all pixels 1102 in the display apparatus 110.

Each pixel 1102 in the control matrix 1100 also includes a write-enable transistor 1131 and a data store capacitor 1133. The gate of the write-enable transistor 1131 is coupled to the scan-line interconnect 1106, the source of the data load transistor 1131 is coupled to the data interconnect 1108 and the drain of the write-enable transistor 1131 is coupled to a first terminal of the data store capacitor 1133. A second terminal of the data store capacitor 1133 is coupled to the shutter common interconnect 1116.

The control matrix 1100 further includes a latch circuit 1140 substantially similar to the latch circuit 1040 depicted in FIG. 10. The latch circuit 1140 includes a first shutter-state inverter and a second shutter-state inverter. The first shutter-state inverter includes a first charge transistor 1142 and a first discharge transistor 1144. The second shutter-state inverter includes a second charge transistor 1152 and a first discharge transistor 1154.

As described above, the latch circuit 1140 is a half-latch. As such, the gate of the first charge transistor 1142 is coupled to the drains of the second charge transistor 1152 and the second discharge transistor 1154, while the gate of the first discharge transistor 1144 is coupled to the data store capacitor 1133 and the drain of the write-enabling transistor 1131. The gates of the second charge transistor 1152 and the second discharge transistor 1154 are coupled to the drains of the first charge transistor 1142 and the first discharge transistor 1144. The drain of the first charge transistor 1142 connects to the drain of the first discharge transistor 1144 at a first shutter-state node 1146. The drain of the second charge transistor 1152 connects to the drain of the second discharge transistor 1154 at a second shutter-state node 1156. As such, the first shutter-state node 1146 controls the gate voltage of both the second charge transistor 1152 and the second discharge transistor 1154 of the second shutter-state inverter and the second shutter-state node 1156 controls the gate voltage of the first charge transistor 1142 of the first shutter-state inverter. The source terminals of the first charge transistor 1142 and the second charge transistor 1152 are coupled to the actuation voltage interconnect 1110. The source terminals of the first discharge transistor 1144 and the second discharge transistor 1154 are coupled to the global update interconnect 1112. The global update interconnect 1112 can be maintained at a voltage significantly higher than that of the shutter common interconnect 1116 to prevent the turn-on of either the first discharge transistor 1144 or the second discharge transistor 1154, regardless of what charge is stored on the data store capacitor 1133.

The dual-actuator shutter assembly 1104 of the pixel 1102 includes a first shutter-state actuator that is coupled to the node 1146 and a second shutter-state actuator that is coupled to the node 1156. A reference electrode of the shutter assembly 1104 is coupled to the shutter common interconnect 1116.

The control matrix 1100 can operate in a way substantially similar to the control matrix 1000 depicted in FIG. 10. Generally, the control matrix 1100 performs a frame addressing and pixel actuation method similar to the frame addressing and pixel actuation method 600 described with respect to FIG. 6. The frame addressing and pixel actuation method utilized for the controlling the control matrix 1100 proceeds in three general stages. First, data voltages corresponding to the pixels are loaded for each pixel one row at a time in a data loading stage. Next, in an update latch stage, the latch for each pixel is set to the appropriate latch state based at least in part on the stored data voltage. Upon setting the latch for each pixel, the pixels are actuated in a shutter actuation stage.

The operation of the control matrix 1100 begins with the data loading stage and proceeds to the update latch stage. In this stage, the control matrix 1100 brings the actuation voltage interconnect voltage down to a voltage below the global update interconnect voltage. Because of the pre-bias transistor 1164, however, a significant charge transfer takes place at this stage. After the actuation voltage interconnect 1110 is brought to a voltage below that of the global update interconnect 1112, the pre-bias transistor 1164 switches to an ON state and current flows from the global update interconnect 1112 onto the first shutter-state node 1146. The first shutter-state node 1146 will then adopt the same voltage as the global update interconnect 1112, for example, a voltage in the range of about 3-6V.

The update latch stage then proceeds with reducing the voltage on the global update interconnect 1112 from a voltage which was substantially the same as the data voltage down to a voltage near zero. This reduction in voltage of the global update interconnect has two effects. First, the pre-bias transistor 1164 will switch to an OFF state, which temporarily isolates the charge and its corresponding voltage at the first shutter-state node 1146. Second, the first discharge transistor 1144 and the second discharge transistor 1154 are placed into a condition to respond to the voltage on the data store capacitor 1133. If a data voltage is stored on the data store capacitor 1133, the first discharge transistor 1144 will turn on and the voltage on the first shutter-state node 1146 will be pulled to zero. On the other hand, if no voltage is stored on the data store capacitor 1133, the pre-bias charge at the first shutter-state node 1146 will remain stored at first shutter-state node 1146 where the first shutter-state node 1146 can later drive or determine the final state of the latch circuit 1140.

After the voltage on the global update interconnect 1112 is reduced, the voltage on the actuation voltage interconnect 1110 is raised to an intermediate voltage or the actuation voltage $V_{at}$ such that the latch circuit 1110 is set. After the voltage on the actuation voltage interconnect 1110 is raised to set the latch circuit 1040, the global update interconnect 1112 is then returned from a voltage at or near zero volts to a voltage that is substantially equal to the data voltage. The update latch stage then proceeds to the shutter actuation stage, where the actuation voltage interconnect 1110 is raised to the actuation voltage $V_{at}$ and the shutter assembly 1104 is caused to actuate to its new state.

In some implementations, a second pMOS pre-bias transistor can be added to the circuit 1100, wired in parallel to the pre-bias transistor 1164. The gate of the second pre-bias transistor can also be connected to the actuation voltage interconnect 1110. The drain of the second pre-bias transistor can be connected to the second shutter-state node 1156. In this fashion, both the first shutter-state node 1146 and the second shutter-state node 1156 can be pre-biased to the update voltage in the early part of the update latch stage.

FIG. 12 shows a portion of a control matrix 1200. The control matrix 1200 can be implemented for use in the display apparatus 100 depicted in FIG. 1. In particular, the control matrix 1200 includes a half-latch circuit in which one of the inputs of the latch circuit is disconnected from the inverter feedback. The control matrix 1200 is configured as a symmetric latch, meaning that the master and slave inverters receive complementary data inputs during the update phase. The control matrix 1200 also utilizes cascode transistors and cascode interconnects to provide protection against high voltage stress.

The control matrix 1200 controls an array of pixels 1202 that includes light modulators having dual-actuator shutter assemblies 1204. The actuators in the shutter assemblies 1204 can be made either electrically bi-stable or mechanically bi-stable.

The control matrix 1200 includes a scan-line interconnect 1206 for each row of pixels 1202 in the control matrix 1200 and a data interconnect 1208 for each column of pixels 1202. The control matrix 1200 further includes an actuation voltage interconnect 1210, a global update interconnect 1212, a shutter common interconnect 1216 and a discharge cascode interconnect 1218 (collectively referred to as "common interconnects"). These common interconnects 1210, 1212, 1216 and 1218 are shared among pixels 1202 in multiple rows and multiple columns in the array. In some implementations, the common interconnects 1210, 1212, 1216 and 1218 are shared among all pixels 1202 in the display apparatus 1200.

Each pixel 1202 in the control matrix 1200 also includes a write-enable transistor 1231 and a data store capacitor 1233. The gate of the write-enable transistor 1231 is coupled to the scan-line interconnect 1206, the source of the data load transistor 1231 is coupled to the data interconnect 1208 and the drain of the write-enable transistor 1231 is coupled to a first terminal of the data store capacitor 1233 and inputs of the latch circuit 1240. A second terminal of the data store capacitor 1233 is coupled to the shutter common interconnect 1216.

The control matrix 1200 further includes the latch circuit 1240. The latch circuit 1240 includes a first shutter-state inverter and a second shutter-state inverter. The first shutter-state inverter includes a first charge transistor 1242, a first discharge transistor 1244 and a first discharge cascode transistor 1262. The second shutter-state inverter includes a second charge transistor 1252, a second discharge transistor 1254 and a second discharge cascode transistor 1264. The first shutter-state inverter and the second shutter-state inverter are cross-coupled such that the inputs of the first shutter-state inverter are coupled to the outputs of the second shutter-state inverter and vice versa. In this way, the first shutter-state inverter and the second shutter-state inverter together operate as a latch or a flip flop circuit. In addition, the latch circuit 1240 also includes a data inverter that includes a data inverter pMOS transistor 1272 and a data inverter nMOS transistor 1274. The data inverter is configured to invert a data voltage provided to the gate of the first discharge transistor 1244. Accordingly, the voltage appearing at the gate of the second discharge transistor 1254 will be the complement of any voltage appearing at the gate of the first discharge transistor 1244. As a result, the latch circuit 1240 operates as a symmetrical latch, since the master and slave inverters of the latch circuit 1240 receive complementary data inputs. A symmetrical latch is a fully determinate latch that is configured for reliable 2-state operation.

The gate of the first discharge transistor 1244 is coupled to the data store capacitor 1233, the drain of the write enable transistor 1231 and the gates of the data inverter pMOS transistor 1272 and the data inverter nMOS transistor 1274. The gate of the first charge transistor 1242 is coupled to the drains of the second charge transistor 1252 and the second discharge cascode transistor 1264. The gate of the second charge transistor 1252 and the drains of the first charge transistor 1242 and the first discharge cascode transistor 1262 are connected to one another at a first shutter-state node 1246. The drain of the second charge transistor 1252 connects to the drain of the second discharge cascode transistor 1264 at a second shutter-state node 1256. The source terminals of the first charge transistor 1242 and the second charge transistor 1252 are coupled to the actuation voltage interconnect 1210. The gate of the first discharge cascode transistor 1262 is connected to the cascode discharge interconnect 1218. The gate of the second discharge cascode transistor 1264 is connected to the cascode discharge interconnect 1218 and the source of the data inverter pMOS transistor 1272. The source terminals of the first discharge cascode transistor 1262 and the second discharge cascode transistor 1264 are connected to the drains of the first discharge transistor 1244 and the second discharge transistor 1254, respectively. The source terminals of the first discharge transistor 1242 and the second discharge transistor 1254 and the second discharge cascode transistor 1264 are coupled to the global update interconnect 1212. The gate of the second discharge transistor 1254 is connected to the drains of the data inverter pMOS transistor 1272 and the data inverter nMOS transistor 1274.

The inputs for the second shutter-state inverter are derived either from an inversion of the data input via the data inverter transistors 1272 and 1274 or directly from the output of the master inverter. The gate inputs of the first and second discharge transistors 1244 and 1254 are electrically isolated from the first and second shutter-state nodes 1246 and 1256, and are therefore not susceptible to transient feedback currents which can occur during update of the latch.

The dual-actuator shutter assembly 1204 of the pixel 1202 includes a first shutter-state actuator that is coupled to the first shutter-state node 1246 and a second shutter-state actuator that is coupled to the second shutter-state node 1256. A reference electrode of the shutter assembly 1204 is coupled to the shutter common interconnect 1216.

In this configuration, the first discharge cascode transistor 1262 and the second discharge cascode transistor 1264 are configured such that their respective source and drain terminals are connected in between the corresponding first and second shutter-state actuators of the shutter assembly 1204 and the respective first discharge transistor 1244 and the second discharge transistor 1254. The addition of the first discharge cascode transistor 1262 helps to reduce the voltage drops experienced across either the source and drain or the gate and drain for either of first charge transistor 1242 or the first discharge transistor 1244. The addition of the second discharge cascode transistor 1264 helps to reduce the voltage drops experienced across either the source and drain or the gate and drain for either of second charge transistor 1252 or the second discharge transistor 1254. The discharge cascode interconnect 1218 helps to ensure that the first discharge cascode transistor 1262 and the second discharge cascode transistor 1264 turn on at substantially the same time.

The control matrix 1200 makes use of two complementary types of transistors, both p-channel and n-channel transistors. It is therefore referred to as a complementary MOS control matrix or a CMOS control matrix. The first charge transistor 1242 and the second charge transistor 1252, for instance, are pMOS transistors, while the first discharge transistor 1244, the first discharge cascode transistor 1262, the second discharge transistor 1254 and the second discharge cascode transistor 1264 are nMOS transistors. In other implementations, the types of transistors employed in control matrix 1200 can be reversed, for example nMOS transistors can be used for the charging transistors and pMOS transistors can be used for the discharging transistors.

In the control matrix 1200, the global update interconnect 1212 is connected to the source of the first discharge transistor 1244, the second discharge transistor 1254, and the nMOS transistor 1274 of the data inverter. Maintaining the global update interconnect 1212 at a potential significantly above that of the shutter common interconnect 1216 prevents the turn-on of the first discharge transistor 1244, the second discharge transistor 1254 or the nMOS transistor 1274 regardless of what data voltage is stored on the data store capacitor 1233.

The operation of the first discharge cascode transistor 1262 and the second discharge cascode transistor 1264 and the discharge cascode interconnect 1218 will be described below. During operation, the discharge cascode interconnect 1218 is maintained at about half the voltage of the actuation voltage interconnect 1210 and, while the light sources are on, at about half the actuation voltage $V_{at}$. Under these operating conditions, the discharge cascode transistor 1262 will be in the ON state whenever the first discharge transistor 1244 is ON. Additionally, when the first discharge transistor 1244 is in the OFF state, then the voltage between source and drain in the first discharge transistor 1244 may not exceed the sum of half the actuation voltage $V_{at}$ and the threshold voltage corresponding to the first discharge transistor 1244. By limiting the source-drain voltage to about half the actuation voltage $V_{at}$, the voltage stress across each of the first discharge transistor 1244 and the discharge cascode transistor 1262 is considerably reduced. Similarly, the discharge cascode transistor 1264 will be in the ON state whenever the second discharge transistor 1254 is ON. Additionally, when the second discharge transistor 1254 is off, then the voltage between source and drain in the second discharge transistor 1254 may not exceed the sum of half the actuation voltage $V_{at}$ and the threshold voltage corresponding to the second discharge transistor 1254. By limiting the source-drain voltage to about half the actuation voltage $V_{at}$, the voltage stress across each of the second discharge transistor 1254 and the discharge cascode transistor 1264 is considerably reduced.

The control matrix 1200 operates in a way substantially similar to the control matrix 500 depicted in FIG. 5. Generally, the control matrix 1200 performs a frame addressing and pixel actuation method similar to the frame addressing and pixel actuation method 600 described with respect to FIG. 6. The frame addressing and pixel actuation method utilized for the controlling the control matrix 1200 proceeds in three general stages. First, data voltages corresponding to the pixels are loaded for each pixel one row at a time in a data loading stage. Next, in an update latch stage, the latch for each pixel is set to the appropriate state based at least in part on the stored data voltage. Upon setting the latch for each pixel, the pixels are actuated in a shutter actuation stage.

The operation of the control matrix 1200 begins with the data loading stage and proceeds to the update latch stage. In this stage, the control matrix 1200 can maintain the actuation voltage interconnect 1210 at a voltage equal to the actuation voltage $V_{at}$. If the actuation voltage $V_{at}$ is, for example, less than about 20 volts and the voltage on the discharge cascode interconnect 1218 is half the actuation voltage, or about 10 volts, then a data voltage of about 6 to 10 volts can be sufficient to update the latch circuit 1240. In this implementation, the update operation can be activated without having to discharge the latch circuit 1240.

During the data loading stage, the global update interconnect 1212 is held at a voltage that is substantially equal to the data voltage. This prevents the turn-on of any of the transistors 1244, 1254, or 1274 and it isolates the latch circuit 1240 from any new data which is stored on the data store capacitor 1233. To update the latch circuit 1240 with new data, the voltage on the global update interconnect 1212 may be reduced for a time sufficient to for the latch transistors to respond to the input voltages on capacitor 1233.

In some implementations where the actuation voltage is a high voltage, for example, a voltage greater than about 20V, the voltage on the actuation voltage interconnect 1210 is reduced to a lower or intermediate voltage just before activating the global update interconnect 1212. After the latch is set by applying an intermediate voltage to the actuation voltage interconnect 1210, the actuation voltage interconnect 1210 is raised again to the higher actuation voltage so that the shutter actuators can respond to the new latch state. Transient currents that occur during latch update consume power and this power can be reduced with a lower charge interconnect voltage during the update sequence.

In some implementations, the discharge cascode interconnect 1218 is maintained at about half the actuation voltage through the update latch stage. In some implementations, the voltage on the discharge cascode interconnect 1218 is pulsed in coordination with the actuation voltage interconnect 1210 so that the voltage placed on the gates of the discharge cascode transistors 1262 and 1264 are about half the voltage on the actuation voltage interconnect 1210.

Several other control matrix configurations are possible which will be recognized as simple variations of the circuit 1200. In some implementations, cascode transistors are added on the charging side of the latch circuit 1240 instead of, or in addition to, the discharge cascode transistors 1262 and 1264 configured on the discharging side of the latch circuit 1240. In some implementations, the data inverter including the transistors 1272 and 1274 is disposed between the data store capacitor 1233 and the first discharge transistor 1244, instead of being connected to the second discharge transistor 1254 as depicted in FIG. 12.

Many useful latch circuits can be realized by combining elements from the control matrices 500, 700, 800, 1000, 1100 and 1200 that are depicted in FIGS. 5, 7, 8, 10, 11 and 12 respectively. In one such combination, a pre-bias transistor is made to operate with a latch circuit that includes cascode transistors and a cascode voltage interconnect. In order to understand how this would work, a pre-bias transistor, such as the pre-bias transistor 1164 depicted in FIG. 11 acts to transfer voltages from the global update interconnect 1112 to the first shutter-state node 1146 as part of the pre-bias operation. However, if the latch circuit 1140 were to be configured as a cascode latch, similar to that shown in latch circuit 1240 depicted in FIG. 12, it then becomes possible in the pre-bias operation to transfer charge and voltages from the cascode interconnect, such as the cascode interconnect 1218, to the first shutter-state node 1146. In this configuration, the gate of the pMOS pre-bias transistor 1164 would be connected to the actuation voltage interconnect 1110 as before, and that transistor would turn on any time the voltage on the actuation voltage interconnect 1210 drops below that of the cascode interconnect 1218. Since the cascode interconnect 1218 is generally held at voltages higher than the global update interconnect 1212, this implementation would save additional power during operation since voltage changes on the actuation voltage interconnect 1210 can be reduced.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. a general purpose processor may be a microprocessor, or, any conventional processor, controller, microcontroller, or state machine. a processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. a storage media may be any available media that may be accessed by a computer. by way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A display apparatus, comprising:
an array of light modulators, each light modulator having a first actuator configured to drive the light modulator towards a first state and a second actuator configured to drive the light modulator into a second state; and
a control matrix including, for each light modulator, a circuit for controlling the light modulator, the circuit including a first shutter-state inverter configured to control the first actuator of the light modulator and a second shutter-state inverter configured to control the second actuator of the light modulator, wherein an output of the first shutter-state inverter is electrically connected to only one input of the second shutter-state inverter and wherein the control matrix is configured to pre-bias a voltage at an output of the second shutter-state inverter and an input of the first shutter-state inverter.

2. The display apparatus of claim 1, wherein the first shutter-state inverter includes a first charge transistor and a first discharge transistor and the second shutter-state inverter includes a second charge transistor and a second discharge transistor.

3. The display apparatus of claim 2, wherein the first and second charge transistors are p-type transistors, and wherein the source of the first and second charge transistors are connected to an actuation voltage interconnect.

4. The display apparatus of claim 3, wherein the first and second discharge transistors are n-type transistors, and wherein the source of the first and second discharge transistors are connected to the global update interconnect.

5. The display apparatus of claim 2, further comprising a data store capacitor coupled to a gate of the second discharge transistor.

6. The display apparatus of claim 1, wherein the circuit is configured to pre-bias a voltage at the output of the second shutter-state inverter and the input of the first shutter-state inverter prior to actuation of the light modulator by electrically connecting the output of the second shutter-state inverter and the input of the first shutter-state inverter to a biasing voltage source.

7. The display apparatus of claim 6, wherein the first shutter-state inverter includes a first charge transistor and a first discharge transistor and the second shutter-state inverter includes a second charge transistor and a second discharge transistor, and wherein a drain of the second charge transistor and respective gates of the first charge transistor and the first discharge transistor are electrically connected to the biasing voltage source.

8. The display apparatus of claim 6, wherein the biasing voltage source is electrically connected to the second shutter-state inverter and gates of the first shutter-state inverter via a capacitor.

9. The display apparatus of claim 6, wherein the biasing voltage source is electrically connected to the second shutter-state inverter and gates of the first shutter-state inverter via a transistor.

10. The display apparatus of claim 1, further comprising a data store capacitor coupled to the second shutter-state inverter and coupled to a first shutter state inverter via a data inverter.

11. The display apparatus of claim 1, further comprising a first cascode transistor coupled to the first shutter-state inverter and a second cascode transistor coupled to the second shutter-state inverter.

* * * * *